(12) United States Patent
Kobayashi et al.

(10) Patent No.: US 8,264,552 B2
(45) Date of Patent: Sep. 11, 2012

(54) IMAGE PROCESSING APPARATUS, IMAGE PROCESSING METHOD, AND RECORDING MEDIUM

(75) Inventors: Seiji Kobayashi, Tokyo (JP); Atsushi Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 401 days.

(21) Appl. No.: 12/510,524

(22) Filed: Jul. 28, 2009

(65) Prior Publication Data

US 2010/0026827 A1  Feb. 4, 2010

(30) Foreign Application Priority Data

Jul. 29, 2008 (JP) ................ P2008-194876

(51) Int. Cl.
 *H04N 5/228* (2006.01)
 *G06K 9/40* (2006.01)
(52) U.S. Cl. .......... 348/208.4; 348/222.1; 382/254
(58) Field of Classification Search .......... 348/208.99, 348/208.1, 208.4, 208.2, 208.12, 208.13, 348/362, 221.1, 240.99, 363, 222.1; 382/254
See application file for complete search history.

(56) References Cited

U.S. PATENT DOCUMENTS

| | | | | |
|---|---|---|---|---|
| 2004/0066460 | A1* | 4/2004 | Kondo et al. | 348/222.1 |
| 2007/0070221 | A1 | 3/2007 | Nishi et al. | |
| 2008/0129873 | A1* | 6/2008 | Nagano et al. | 348/699 |
| 2008/0259169 | A1* | 10/2008 | Nagano et al. | 348/208.4 |
| 2009/0207259 | A1* | 8/2009 | Ito et al. | 348/208.4 |
| 2009/0316009 | A1* | 12/2009 | Ito et al. | 348/208.4 |
| 2010/0026880 | A1* | 2/2010 | Ito et al. | 348/222.1 |
| 2010/0214422 | A1* | 8/2010 | Iwamura et al. | 348/208.4 |

FOREIGN PATENT DOCUMENTS

| | | |
|---|---|---|
| JP | 2003-6648 | 1/2003 |
| JP | 2006-81150 | 3/2006 |
| JP | 2007-274299 | 10/2007 |

\* cited by examiner

*Primary Examiner* — Nhan T Tran
(74) *Attorney, Agent, or Firm* — Finnegan, Henderson, Farabow, Garrett & Dunner, LLP

(57) ABSTRACT

An image processing apparatus includes a still/motion determining unit and a motion blur adder. The still/motion determining unit makes a still/motion determination for each region of respective unit images constituting motion image data. The motion blur adder then adds motion blur to the motion image data on the basis of the still/motion determination and imaging information expressing parameters whereby the motion image data was generated as a result of imaging by an imaging apparatus.

14 Claims, 20 Drawing Sheets

FIG. 18

| SCORE VALUE E (Ex OR Ey) | BASE LAYER WEIGHT $w_0$ | REDUCED LAYER 1 WEIGHT $w_1$ | REDUCED LAYER 2 WEIGHT $w_2$ | REDUCED LAYER 3 WEIGHT $w_3$ |
|---|---|---|---|---|
| LV1 | 1.00 | 0.00 | 0.00 | 0.00 |
| LV2 | 0.64 | 0.36 | 0.00 | 0.00 |
| LV3 | 0.32 | 0.60 | 0.08 | 0.00 |
| LV4 | 0.16 | 0.48 | 0.32 | 0.00 |
| LV5 | 0.08 | 0.32 | 0.54 | 0.06 |
| LV6 | 0.04 | 0.16 | 0.48 | 0.32 |
| LV7 | 0.02 | 0.08 | 0.24 | 0.66 |
| LV8 | 0.01 | 0.04 | 0.12 | 0.83 |

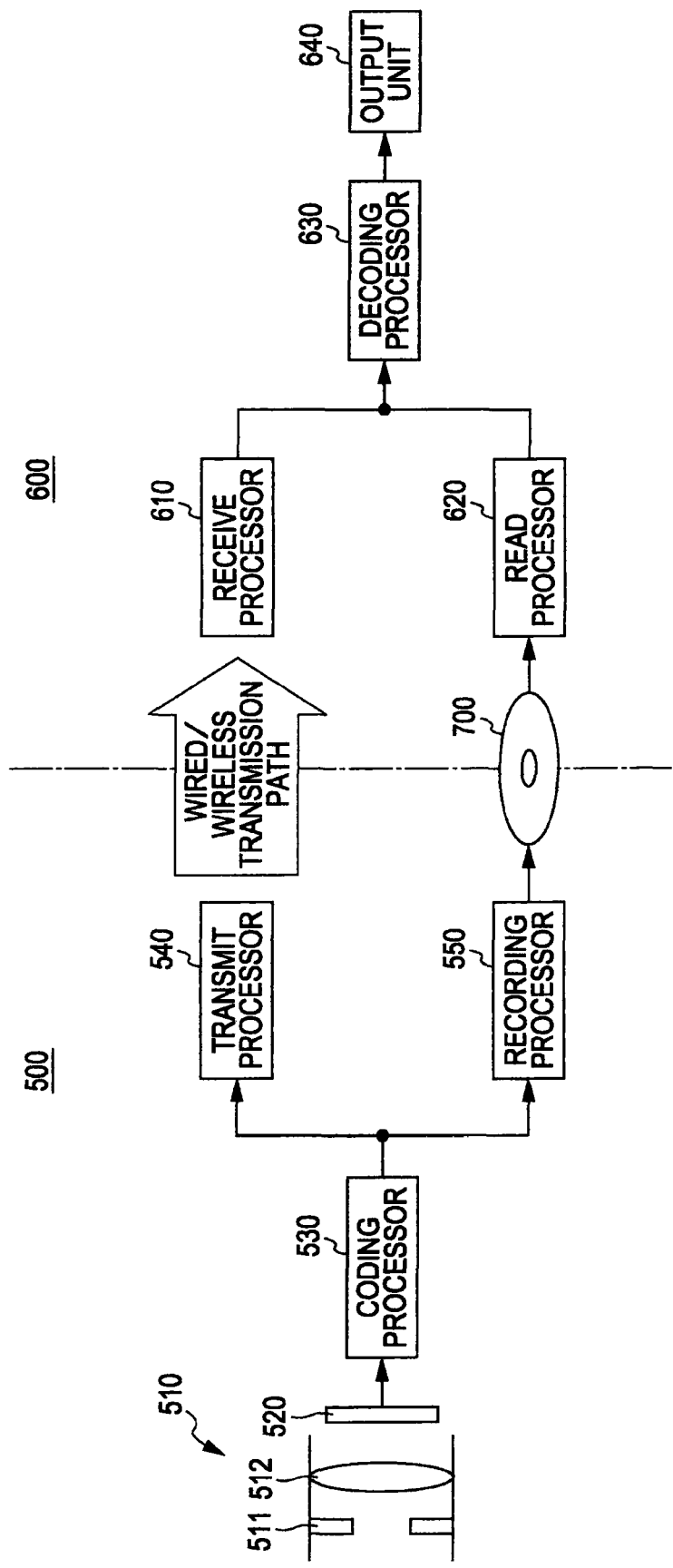

IMAGE PROCESSING APPARATUS, IMAGE PROCESSING METHOD, AND RECORDING MEDIUM

BACKGROUND OF THE INVENTION

1. Field of the Invention

The present invention relates to an image processing apparatus and an image processing method whereby motion blur is added to motion images, as well as to a recording medium storing a program that causes a computer or other computational apparatus to execute such image processing.

2. Description of the Related Art

Consider a series of motion images imaged by an imaging apparatus having shutter functions, wherein the effective exposure time of each frame is short with respect to the period determined by the frame rate. When such motion images are displayed using a display device, the motion of moving objects in the motion images will be displayed in a discontinuous manner, and in some cases result in a visual reduction in picture quality wherein a viewer viewing the motion images perceives overlapping images.

Such motion image quality reduction due to unnatural motion is typically referred to as motion jerkiness, and is defined in the ANSI T1.801.02-1996 standard.

A specific example of the production of motion jerkiness will now be described with the use of the motion image imaging apparatus 500 and motion image playback apparatus 600 shown in FIG. 20.

The motion image imaging apparatus 500 images and encodes motion images according to a standard such as MPEG (Moving Picture Experts Group), and then records the encoded image data onto a recording medium 700 such as a DVD (Digital Versatile Disc).

More specifically, the motion image imaging apparatus 500 includes imaging optics 510 that focus light from the object, imaging elements 520 that receive and convert the light focused by the imaging optics 510 into an image signal, and a coding processor 530 that encodes the image signal output by the imaging elements 520.

In addition, the motion image imaging apparatus 500 is also provided with a transmit processor 540 that externally transmits image data encoded by the coding processor 530 via a transmission path, and a recording processor 550 that records image data encoded by the coding processor 530 onto a DVD or similar recording medium 700.

The imaging optics 510 include an aperture mechanism 511 that adjusts the amount of incident object light, and an optical lens system 512 that causes object light (whose amount has been adjusted by the aperture mechanism 511) to be focused onto the light-accepting surface of the imaging elements 520.

Meanwhile, the motion image playback apparatus 600 decodes encoded image data and then outputs the result to a display or similar device.

More specifically, the motion image playback apparatus 600 includes a receive processor 610 that receives encoded image data transmitted via the transmission path, and a read processor 620 that reads encoded image data from the recording medium 700.

In addition, the motion image playback apparatus 600 is also provided with a decoding processor 630 that decodes encoded image data output from the receive processor 610 and the read processor 620, as well as an output unit 640 that outputs an image signal decoded by the decoding processor 630 to a display or similar device.

When imaging motion images outdoors in a bright environment, for example, a motion image imaging apparatus 500 of the related art like that described above appropriately controls the exposure amount so as to limit the amount of light incident on the imaging elements 520 by narrowing the aperture mechanism 511.

Normally, however, the image is blurred by diffraction phenomena if the aperture mechanism 511 is excessively narrowed. For this reason, the motion image imaging apparatus 500 conducts suitable exposure control by increasing the shutter speed in addition to adjusting the amount of light by means of the aperture mechanism 511.

Exposure control is also conducted by modifying the shutter speed in motion image imaging apparatus that are not provided with aperture mechanisms.

By increasing the shutter speed in this way, the motion image imaging apparatus 500 is able to conduct suitable exposure control for outdoor imaging and similar situations.

However, when a motion image imaging apparatus 500 of the related art excessively increases the shutter speed, a phenomenon occurs wherein the image motion no longer appears smooth to the human eye.

Such picture quality reduction due to unnatural motion is typically referred to as motion jerkiness. In other words, if the motion image imaging apparatus 500 acquires motion images such that jerkiness is produced, then the motion image playback apparatus 600 will decode and display the jerky image data as-is on the output unit 640.

SUMMARY OF THE INVENTION

As described above, images imaged using an extremely fast shutter speed with respect to the motion image frame rate are highly sharp when displayed as still images, but when displayed as a series of motion images, the motion of objects in the motion images is not smooth and looks unnatural to the human eye.

Consequently, the applicant has previously proposed technology whereby motion vectors are detected for motion images, and motion blur is then appropriately added to the motion images using the motion vectors (see Japanese Unexamined Patent Application Publication No. 2007-274299, equivalent to EP 2003876/A2).

However, significant processing load is incurred to detect motion vectors for respective regions in each frame constituting a series of motion images, for example, and in some cases such processing may be unsuited to simple apparatus or systems.

It is thus desirable to provide an image processing apparatus, an image processing method, and a recording medium whereby a simple technique with a light processing load is used to appropriately add motion blur to motion images and reduce jerkiness.

An image processing apparatus in accordance with an embodiment of the present invention includes: still/motion determining means for making a still/motion determination for each region of respective unit images constituting motion image data; and motion blur adding means for adding motion blur to the motion image data on the basis of the still/motion determination and imaging information expressing parameters whereby the motion image data was generated as a result of imaging by an imaging apparatus.

The motion blur adding means may also add motion blur to regions of the respective unit images determined to be motion regions by the still/motion determining means.

The still/motion determining means may also generate per-region score values on the basis of the imaging information and the result of a determination whether a given region is a still region or a motion region. The motion blur adding means may then add motion blur to respective unit images of the motion image data on the basis of the score values.

The still/motion determining means may also generate the score values by means of weighted addition using plural types of imaging information.

The motion blur adding means may also add motion blur such that the amount of motion blur increases with faster shutter speeds, as specified by shutter speed information included in the imaging information.

The motion blur adding means may also add motion blur such that the amount of motion blur increases with increased aperture values, as specified by aperture value information included in the imaging information.

The motion blur adding means may also add motion blur such that the amount of motion blur increases with larger focal lengths, as specified by focal length information included in the imaging information.

The motion blur adding means may also add motion blur such that the amount of motion blur increases with increased gyroscope rotation, as specified by gyroscope rotation information included in the imaging information.

The motion blur adding means may include: a reduced image generator configured to generate, from the unit images, one or more reduced images having different resolutions; and a pixel compositing processor configured to extract, from the one or more reduced images, pixels positionally corresponding to a subject pixel in the unit images, and, on the basis of the still/motion determination and the imaging information, add motion blur to the unit images by conducting weighted addition of the subject pixel and the one or more extracted pixels that were extracted from the one or more reduced images.

The image processing apparatus may also be provided with imaging means for imaging an object to generate the motion image data. The motion image data obtained by the imaging means may then be input into the still/motion determining means and the motion blur adding means.

The image processing apparatus may also be provided with playback means for playing back motion image data by means of recording medium playback operations. The motion image data played back by the playback means may then be input into the still/motion determining means and the motion blur adding means.

The image processing apparatus may also be provided with receiving means for receiving motion image data. The motion image data received by the receiving means may then be input into the still/motion determining means and the motion blur adding means.

An image processing method in accordance with another embodiment of the present invention includes the steps of: making a still/motion determination for each region of respective unit images constituting motion image data; and adding motion blur to the motion image data on the basis of the still/motion determination and imaging information expressing parameters whereby the motion image data was generated by imaging.

A recording medium in accordance with another embodiment of the present invention stores a program that causes a computer to execute the above still/motion determining step and motion blur adding step.

In an embodiment of the present invention, processing is conducted to add motion blur to unit images (image data for single frames, for example) in input motion image data. The motion blur is added on the basis of per-region still/motion determination, as well as imaging information expressing parameters whereby the unit images were imaged. The still/motion determination is processing to determine, on a per-region basis, whether a given region in a frame (i.e., a pixel unit or pixel block unit made up of a plurality of pixels) is a motion region or a still region. It is possible to conduct the still/motion determination using simple processing, such as by comparison with adjacent frames, for example.

Imaging information refers to information such as shutter speed information, aperture value information, focal length information, and gyroscope rotation information (e.g., information indicating horizontal and vertical motion of the imaging apparatus), for example.

On the basis of the above still/motion determination and imaging information, motion blur is added to regions in the motion images where jerkiness is likely to occur. In so doing, motion blur can be added without the heavy processing load incurred by detecting motion vectors for each region within a frame.

Thus, according to an embodiment of the present invention, suitable motion blur can be added to individual unit images in a series of motion images, in accordance with still/motion determination and imaging information expressing parameters whereby the motion images were imaged. As a result, motion images with reduced jerkiness that appears more natural to the human eye is output.

More particularly, suitable motion blur can be simply added without the heavy processing load associated with methods such as motion vector detection, thereby enabling simplification of the apparatus and reduction in costs.

BRIEF DESCRIPTION OF THE DRAWINGS

FIG. 18 is a diagram for explaining a weighting information table in accordance with an embodiment of the present invention;

FIG. 20 is a block diagram of a motion image imaging apparatus and a motion image playback apparatus of the related art.

DESCRIPTION OF THE PREFERRED EMBODIMENTS

Hereinafter, preferred embodiments for carrying out the present invention will be described in detail and with reference to the accompanying drawings. An image processing apparatus in accordance with an embodiment of the present invention adds motion blur to jerky motion images that appear unnatural to the human eye, thereby reducing such jerkiness.

The description hereinafter will proceed as follows.
1. Basic configuration example
2. First embodiment: motion image imaging apparatus
   [2-1: General configuration of motion image imaging apparatus]
   [2-2: Imaging information and score value generation]
   [2-3: Exemplary configuration and operation of motion blur adder]
   [2-4: Summary and conclusions]
3. Second embodiment: playback and receiving apparatus]
4. Recording medium]

1. Basic Configuration Example

First, a basic configuration example of an image processing apparatus in accordance with an embodiment of the present invention will be described with reference to FIG. 1. The first embodiment hereinafter described is a motion image imaging apparatus containing the configuration of the image processing apparatus 100 shown in FIG. 1, while the second embodiment is a playback and receiving apparatus containing the configuration of the image processing apparatus 100 shown in FIG. 1.

The image processing apparatus 100 in accordance with the basic configuration of an embodiment of the present invention uses image processing to generate images with reduced jerkiness. When displaying imaged motion images using a display apparatus, the motion images may appear jerky and unnatural to the human eye. Consequently, in an embodiment of the present invention, jerkiness is reduced by appropriately adding motion blur using imaging information expressing parameters whereby the input motion images were imaged. In so doing, a high-quality image signal with few defects is generated and output. Thus, processing to improve image quality is realized.

Figure 1:
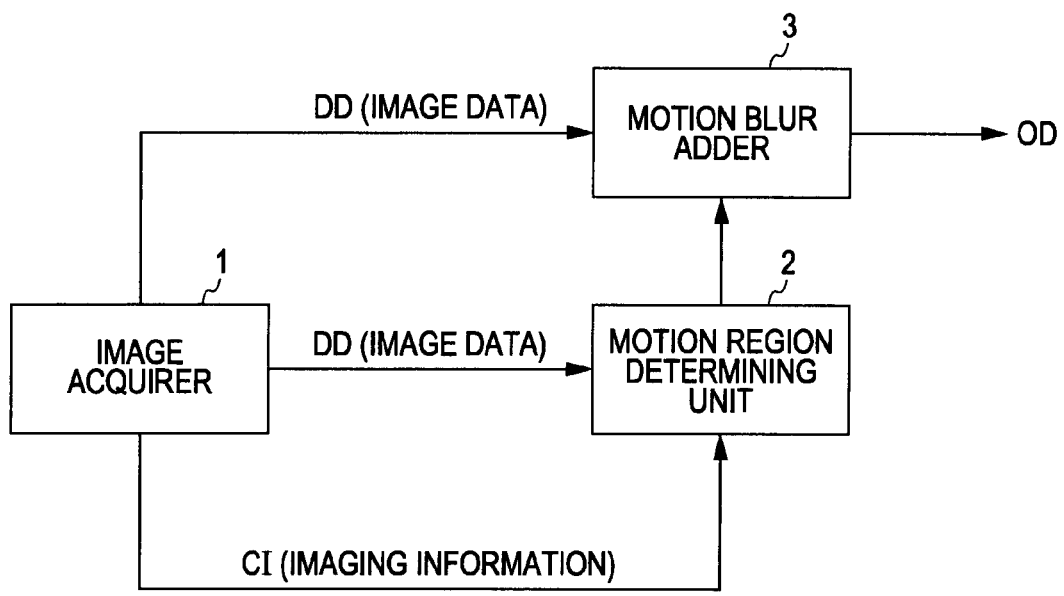
FIG. 1 is a block diagram of an image processing apparatus in accordance with the basic configuration of an embodiment of the present invention.

The image processing apparatus 100 shown in FIG. 1 is provided with an image acquirer 1, a motion region determining unit 2, and a motion blur adder 3. The image acquirer 1 is configured to acquire and import image data into the image processing apparatus 100. For example, the image acquirer 1 may acquire image data DD expressing motion images from an imaging apparatus or similar device. The image acquirer 1 subsequently supplies the image data DD to the motion region determining unit 2 and the motion blur adder 3.

There also exists, in association with the acquired image data DD, information expressing parameters whereby the image data DD was imaged. Such information exists in the form of imaging information CI, and includes shutter speed, aperture value, focal length, and gyroscope information, for example. The image acquirer 1 extracts the various imaging information CI with respect to the acquired image data DD, and then supplies the extracted information to the motion region determining unit 2.

The motion region determining unit 2 detects moving objects on the basis of differences among adjacent frames in the image data DD. For example, given a particular region within a frame to be processed (i.e. a pixel unit or pixel block unit made up of a plurality of pixels), the motion region determining unit 2 may determine whether that region is a motion region or a still region. The motion region determining unit 2 makes such a still/motion determination on a per-region basis. In addition, on the basis of the imaging information CI, the motion region determining unit 2 generates score values expressing the degree of jerkiness for moving objects, and then supplies the score values to the motion blur adder 3.

The motion blur adder 3 generates pseudo motion blur with respect to input image data DD, on the basis of the score values provided by the motion region determining unit 2. As a result, output image data OD with reduced jerkiness is output. Although a variety of algorithms for generating motion blur may be considered, one particular example will be given hereinafter as part of the description of the first embodiment.

In an image processing apparatus 100 as described above, the motion blur adder 3 adds motion blur to unit images in the input image data DD (image data for single frames, for example). Motion blur is added on the basis of the results of the per-region still/motion determination conducted by the motion region determining unit 2, as well as on the basis of the imaging information CI. More specifically, on the basis of both the still/motion determination and the imaging information CI, the motion blur adder 3 adds motion blur to regions in the motion images where jerkiness is likely to occur. In so doing, the addition of suitable blur is realized and jerkiness is reduced, without the heavy processing load incurred by detecting motion vectors for each region within a frame.

2. First Embodiment

Motion Image Imaging Apparatus

[2-1: General Configuration of Motion Image Imaging Apparatus]

Figure 2:
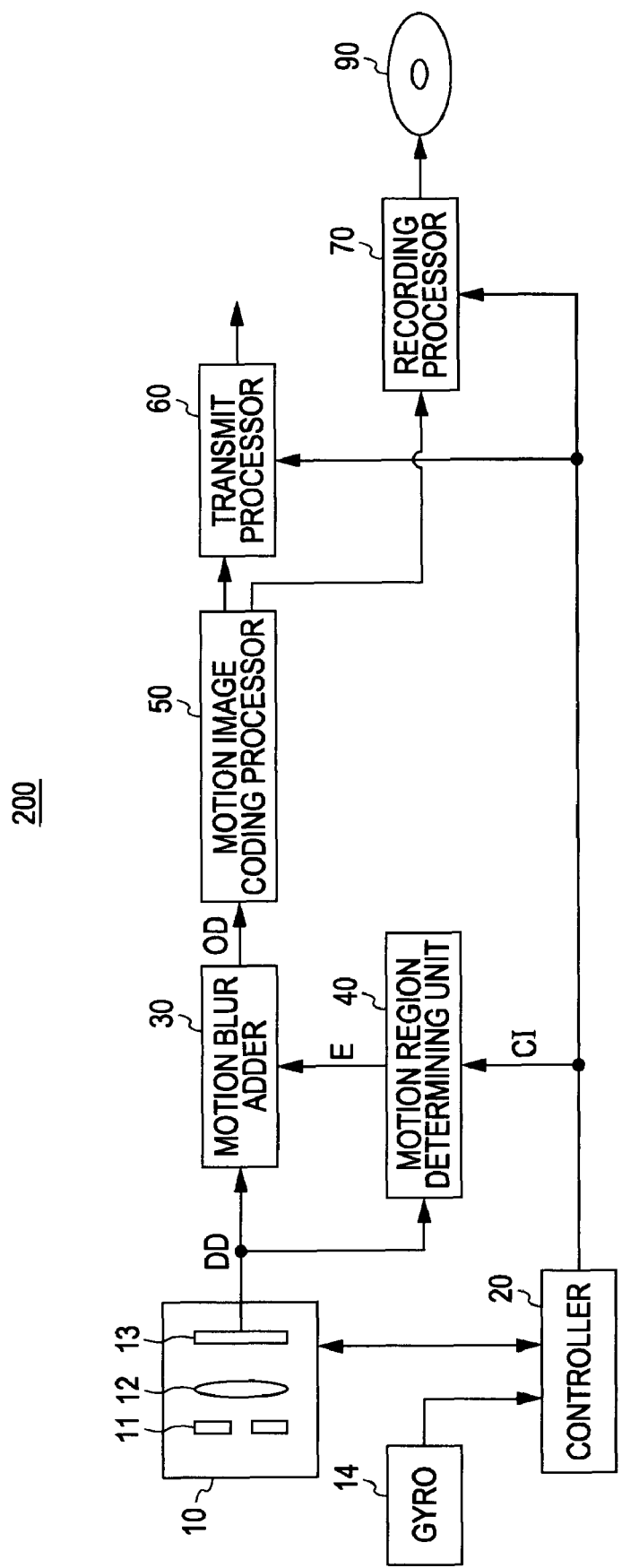
FIG. 2 is a block diagram of a motion image imaging apparatus in accordance with a first embodiment of the present invention.

The configuration of a motion image imaging apparatus 200 in accordance with the first embodiment will now be described with reference to FIG. 2. The motion image imaging apparatus 200 herein images an object, performs processing to add motion blur to the imaged motion images as described above, and then outputs the result.

More specifically, the motion image imaging apparatus 200 acquires motion images by imaging an object, and subsequently records the imaged images to a DVD or similar recording medium 90, or transmits the imaged images to an external device. As shown in FIG. 2, the motion image imaging apparatus 200 is provided with imaging optics 10, which include an aperture mechanism 11, an optical lens system 12, and imaging elements 13.

The aperture mechanism 11 adjusts the amount of incident object light. The optical lens system 12 causes object light (whose amount has been adjusted by the aperture mechanism 11) to be focused onto the light-accepting surface of the imaging elements 13.

The imaging elements 13 receive light focused by the optical lens system 12 onto the light-accepting surface thereof, and convert the received light into an image signal. The imaging elements 13 then conduct predetermined signal processing and output the resulting motion images in the form of image data DD. The image data DD output from the imaging elements 13 is then supplied to a motion blur adder and a motion region determining unit 40.

The image data DD is herein assumed to be made up of unit images in progressive format at a frame rate of 60 fps, for example. However, it should be appreciated that the image data DD is not limited to being in progressive format, and may also be made up of unit images that form a series of motion images in interlaced format.

The motion image imaging apparatus 200 is also provided with a gyro sensor 14, which detects motion of the motion image imaging apparatus 200 itself. For example, the gyro sensor 14 may detect rotation information in the horizontal and vertical directions. This rotation information is used for features such as image stabilization, while additionally being used as one component of the imaging information CI for adding motion blur in the present example.

A controller 20 controls the overall operation of the motion image imaging apparatus 200. The controller 20 may be realized by means of a microcontroller, for example. The controller 20 conducts various controls, such as control of imaging operations, signal processing control, control of recording onto the recording medium 90, and control of transmission to external devices, for example.

The control of imaging operations by the controller 20 includes control of focusing and zooming by driving lenses with respect to the imaging optics 10 when imaging. In addition, the controller 20 also controls the opening and closing of the aperture mechanism 11, the shutter speed at the imaging elements 13, and exposure adjustment by means of signal gain control, for example. The controller 20 may also conduct image stabilization control, on the basis of the detected motion of the motion image imaging apparatus 200 itself by the gyro sensor 14, for example.

Although detailed description of the various control operations is omitted herein, one process conducted by the controller 20 that is related to the image processing of the present example is the outputting of the imaging information CI. More specifically, the controller 20 is able to obtain information regarding the acquired image data DD from the control operations performed during imaging, as described above. The information may include shutter speed information, aperture value information, focal length information, and gyroscope rotation information, for example. The controller 20 then supplies this various information to the motion region determining unit 40 in the form of imaging information CI.

As later described with reference to FIG. 5, the motion region determining unit 40 takes a given region within a frame (i.e., a pixel unit or pixel block unit made up of a plurality of pixels), and on the basis of differences among adjacent frames in the image data DD, determines whether that region is a motion region or a still region. In addition, on the basis of the imaging information CI, the motion region determining unit 2 generates score values E expressing the degree of jerkiness for moving objects, and then supplies the score values to the motion blur adder 30.

The configuration and processing of the motion blur adder 30 will be later described in detail and with reference to FIGS. 6 to 18. Briefly, the motion blur adder 30 generates pseudo motion blur with respect to input image data DD, on the basis of the score values provided by the motion region determining unit 40. In this case, the motion blur adder 30 adds motion blur to regions where jerkiness is likely to occur, in accordance with the magnitude of the jerkiness. By thus adaptively adding motion blur, the motion blur adder 30 outputs output image data OD wherein jerkiness has been reduced.

After the motion blur adder 30 adaptively adds motion blur, the resulting output image data OD is compressed by a motion image coding processor 50. The compressed data stream is then supplied to the transmit processor 60 or the recording processor 70.

The transmit processor 60 encodes and modulates the compressed data stream for transmission, and then outputs the data stream by transmitting to an external device.

The recording processor 70 encodes and modulates the compressed data stream for recording, and then records the data stream onto an optical disc or other recording medium 90, for example.

The controller 20 additionally provides the imaging information CI to the transmit processor 60 and the recording processor 70. The transmit processor 60 and the recording processor 70 are thus able to respectively transmit or record the transmit data or recording data with the imaging information CI superimposed thereon.

[2-2: Imaging Information and Score Value Generation]

In a motion image imaging apparatus 200 configured like the above, the motion region determining unit 40 determines motion regions in each frame of the image data DD, and motion blur is subsequently added to the motion regions by the motion blur adder 30. However, the motion region determining unit 40 also generates score values for adding motion blur, and then provides the score values to the motion blur adder 30. The score values are generated using the imaging information CI.

The imaging information CI provided to the motion region determining unit 40 by the controller 20 is herein assumed to be shutter speed information S, aperture value information F, focal length information D, and gyroscope rotation information GX (horizontal rotation) and GY (vertical rotation).

Additionally, the score values E generated by the motion region determining unit 40 are herein assumed to be information indicating how much motion blur is to be added to each motion region within a frame, for example.

FIGS. 3A, 3B, and FIGS. 4A to 4C illustrate concepts whereby the motion region determining unit 40 generates score values on the basis of imaging information CI. FIGS. 3A, 3B and FIGS. 4A to 4C are graphs used by the motion region determining unit 40 to control score values E in accordance with imaging information CI provided by the controller 20. In each of the graphs shown in FIGS. 3A, 3B, and FIGS. 4A to 4C, the vertical axis represents a particular score value E and its range of high and low values. Herein, a high score value E is taken to mean that the motion of the object is large, jerkiness is significant, and thus a large amount of motion blur is to be added.

Figure 3A:
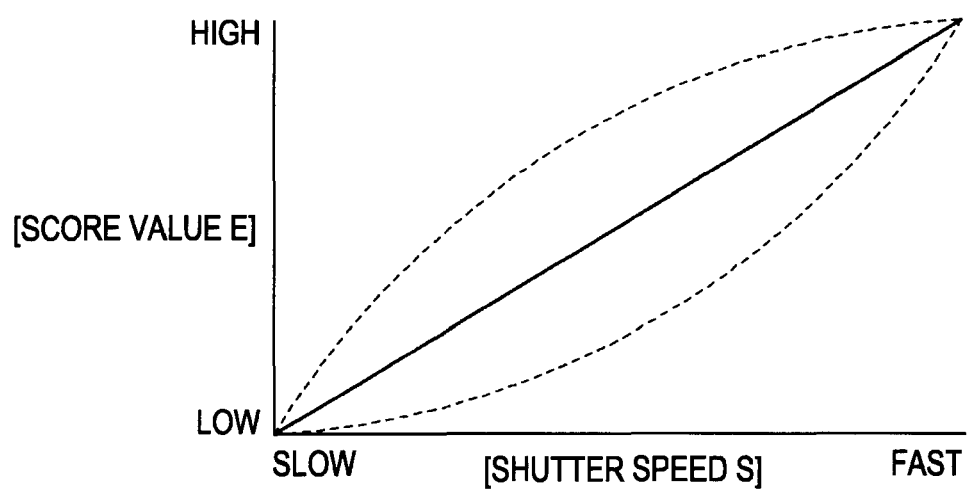
FIG. 3A is a diagram for explaining imaging information in an embodiment of the present invention.

In FIG. 3A, the horizontal axis represents the shutter speed S as one type of information included in the imaging information CI. As described earlier, the controller 20 is able to obtain the shutter speed used for imaging from electronic shutter function control information used when driving the imaging elements 13.

When the shutter speed indicated by the supplied shutter speed information is faster than the frame rate of the image data DD, the motion region determining unit 40 causes score values in motion regions to increase by a power of the speed. When the shutter speed indicated by the shutter speed information is equal to the frame rate, the score value lowers, and the processing to add motion blur is invalidated.

Herein, the frame rate is expressed in frames per second (fps). A frame rate of 60 fps thus equates to 60 frames in 1 second. In this case, the exposure time of the electronic shutter for a single frame at the imaging elements normally has a maximum of 1/60 sec. This is the shutter speed referred to herein. Typically, the electronic shutter control is conducted for functions such as exposure control. In the present case, the exposure period is varied among single frame periods. For example, exposure adjustment may be conducted such that the exposure time (i.e., shutter speed) within 1/60 sec is varied among 1/120 sec, 1/180 sec, and 1/1000 sec, for example. The motion region determining unit 40 thus generates score values E by comparing the above shutter speed S to the original shutter speed expressing the frame rate (such as 1/60 sec).

Taking S to be the shutter speed, and Es to be a score value dependent on the shutter speed S, then $$Es=fs(S)$$

can be used to manipulate score values. If the function fs(x) is taken to be a linearly increasing function, then a plot like that shown by the solid line in FIG. 3A is realized. However, a non-linear function may also be used, and score values E dependent on the shutter speed S may also be generated like that shown by the broken lines in FIG. 3A, for example.

Figure 3B:
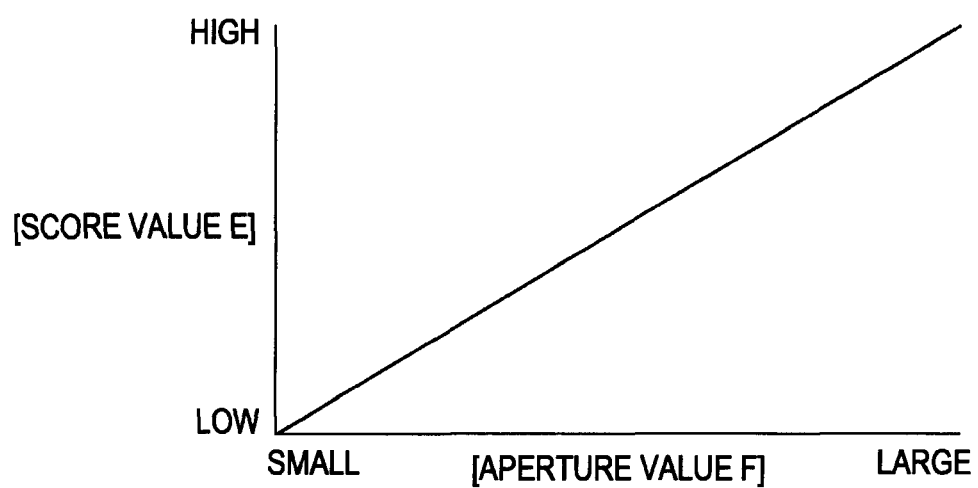
FIG. 3B is a diagram for explaining imaging information in an embodiment of the present invention.

FIG. 3B is a graph used by the motion region determining unit 40 to control score values in accordance with an aperture value F provided by the controller 20. The controller 20 is able to obtain the aperture value F used for imaging from the control information of the imaging optics 10.

When the aperture value F is small, the motion region determining unit 40 determines that the depth of field is shallow, the area around the object is easily blurred, and thus jerkiness is unlikely to occur. For this reason, the motion region determining unit 40 lowers the score value E. In contrast, when the aperture value F is large, the motion region determining unit 40 determines that the depth of field is deep, the image is sharp throughout, and thus jerkiness is likely to occur. For this reason, the motion region determining unit 40 raises the score value E.

If Ef is herein taken to be the score value dependent on the aperture value F, then $$Ef=ff(F)$$

can be used to manipulate score values. It should be appreciated that the function ff(x) is not limited to being a linearly increasing function as shown in FIG. 3B, and may also be a non-linear function.

Figure 4A:
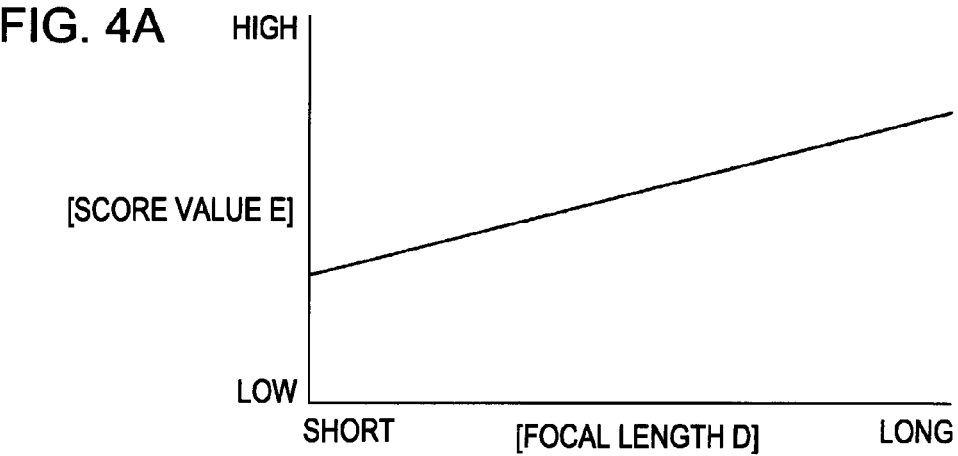
FIG. 4A is a diagram for explaining imaging information in an embodiment of the present invention.

FIG. 4A is a graph used by the motion region determining unit 40 to control score values in accordance with a focal length D provided by the controller 20. The controller 20 is able to obtain the focal length D used for imaging from the control information of the imaging optics 10.

When the focal length D is short (i.e., wide-angle), then the depth of field deepens, and jerkiness is likely to occur when considering this factor alone. However, in this case, camera unsteadiness and object motion is relatively small on screen, and thus the motion region determining unit 40 determines that jerkiness is unlikely to occur overall, and lowers the score value.

In contrast, when the focal length D is long (i.e., telescopic), then the depth of field narrows, and jerkiness is unlikely to occur when considering this factor alone. However, in this case, camera unsteadiness and object motion is relatively large on screen, and thus the motion region determining unit 40 determines that jerkiness is likely to occur overall, and raises the score value.

If Ed is herein taken to be the score value for the focal length D, then $$Ed=fd(D)$$

can be used to manipulate score values. It should be appreciated that fd(x) is not limited to being a linearly increasing function as shown in FIG. 4A, and a non-linear function may also be used.

Figure 4B:
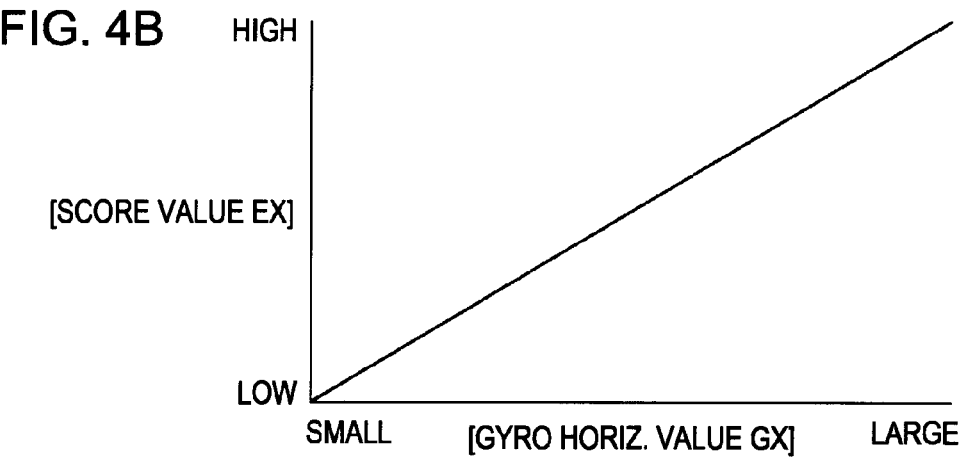
FIG. 4B is a diagram for explaining imaging information in an embodiment of the present invention.

FIG. 4B is a graph used by the motion region determining unit 40 to control a horizontal score value EX in accordance with gyroscope information (specifically, the horizontal rotation GX) provided by the controller 20. The controller 20 is able to acquire the horizontal motion of the motion image imaging apparatus 200 itself from the information detected by the gyro sensor 14.

When the horizontal rotation GX (i.e., rotation about the vertical axis) is small, the motion region determining unit 40 determines that on-screen motion is small and jerkiness is unlikely to occur, and thus lowers the horizontal score value EX. In contrast, when the rotation GX is large, the motion region determining unit 40 determines that jerkiness is likely to occur, and thus raises the horizontal score value EX. If Egx is herein taken to be the horizontal score value for the rotation GX, then $$Egx=fgx(GX)$$

can be used to manipulate score values. It should be appreciated that the function fgx(x) is not limited to being a linearly increasing function as shown in FIG. 4B, and may also be a non-linear function.

Figure 4C:
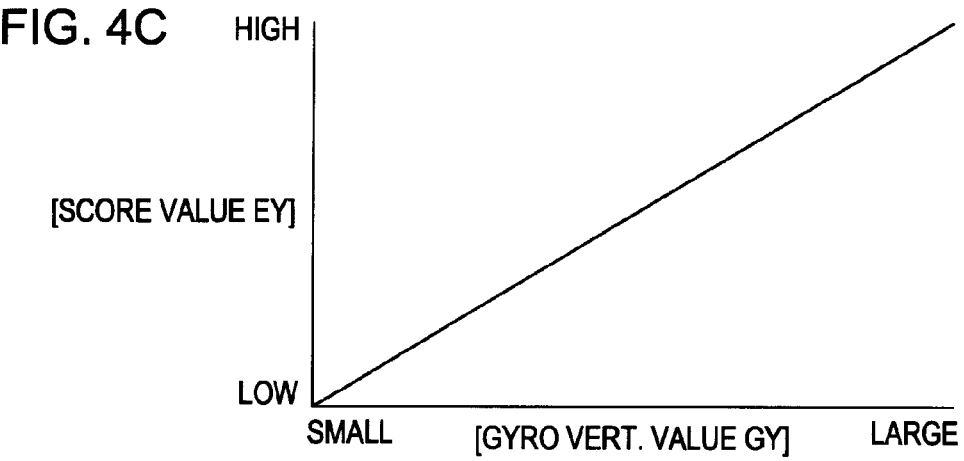
FIG. 4C is a diagram for explaining imaging information in an embodiment of the present invention.

FIG. 4C is a graph used by the motion region determining unit 40 to control a vertical score value EY in accordance with gyroscope information (specifically, the vertical rotation GY) provided by the controller 20. The controller 20 is similarly able to acquire the vertical motion of the motion image imaging apparatus 200 itself from the information detected by the gyro sensor 14.

When the vertical rotation GY (i.e., rotation about the horizontal axis) is small, the motion region determining unit 40 determines that on-screen motion is small and jerkiness is unlikely to occur, and thus lowers the vertical score value EY. In contrast, when the rotation GY is large, the motion region determining unit 40 determines that jerkiness is likely to occur, and thus raises the vertical score value EY. If Egy is herein taken to be the horizontal score value for the rotation GY, then $$Egy=fgy(GY)$$

can be used to manipulate score values. It should be appreciated that the function fgy(y) is not limited to being a linearly increasing function as shown in FIG. 4B, and may also be a non-linear function.

The motion region determining unit 40 thus generates score values E in accordance with the imaging information CI using methods like those described by way of example above.

Figure 5:
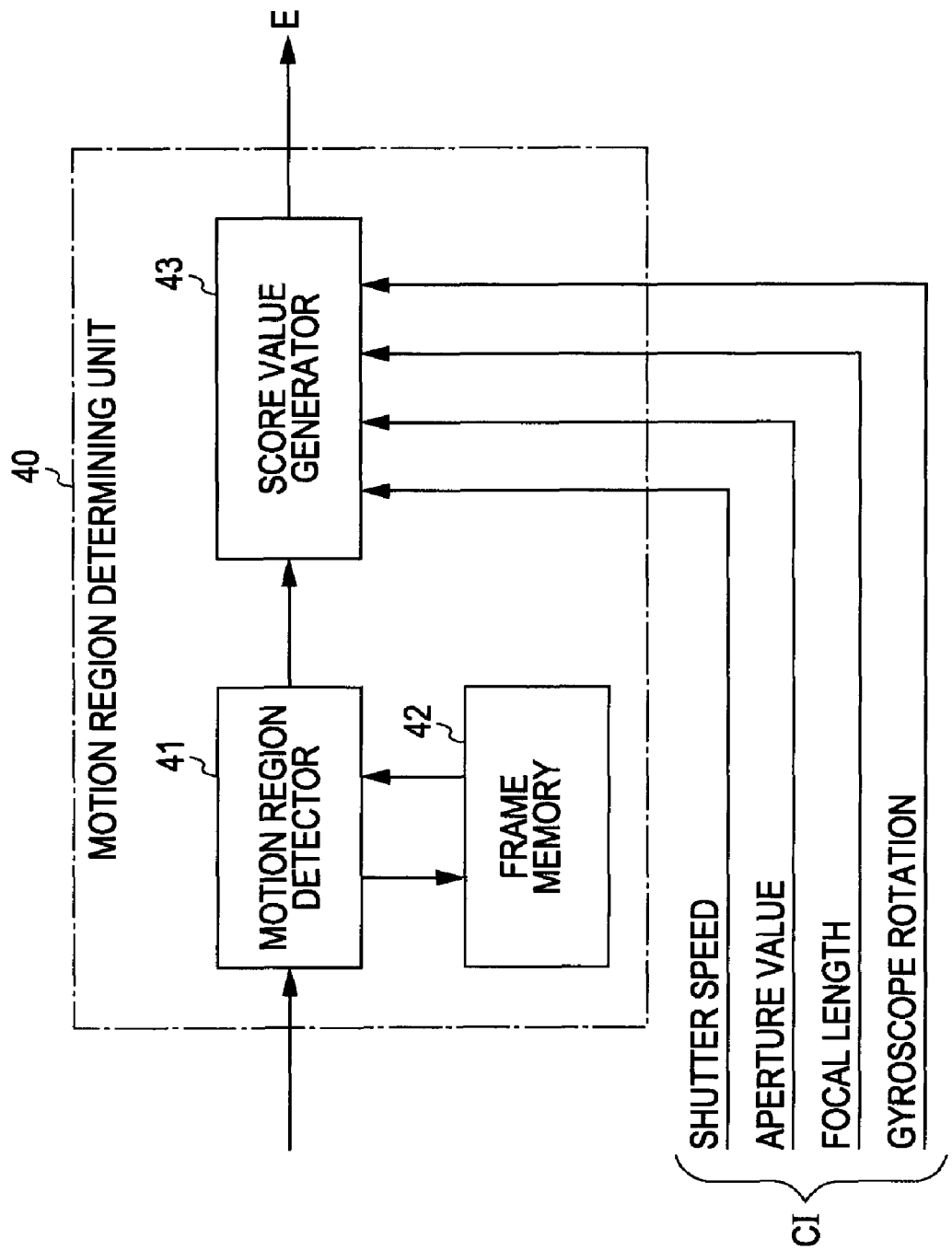
FIG. 5 is a block diagram of a motion region determining unit in accordance with an embodiment of the present invention.

FIG. 5 illustrates an exemplary configuration of the motion region determining unit 40. The motion region determining unit 40 is provided with a motion region detector 41, frame memory 42, and a score value generator 43.

The motion region detector 41 detects regions with movement (i.e. motion regions) by solving for the difference between the current frame image and the immediately previous frame image in the input image data DD. Herein, a region may be a pixel unit, or a pixel block unit made up of a plurality of pixels.

More specifically, while storing an image of the current frame in the frame memory 42, the motion region detector 41 reads the image of the previous frame from the frame memory 42, and then conducts differential calculation on a per-region basis. The calculation results are subsequently used to output detection result values indicated whether each respective region is a motion region or a still region. For example, the motion region detector 41 may generate detection result information for each region in the current frame, wherein motion regions are represented as 1, and still regions are represented as 0. This detection result information is then supplied to the score value generator 43.

The score value generator 43 then generates score values with respect to the motion regions (i.e., the regions having a value of 1 in the detection results) specified by the detection results output from the motion region detector 41. The score value generator 43 generates score values on the basis of the imaging information CI (i.e., the shutter speed S, the aperture value F, the focal length D, and the rotations GX and GY) provided by the controller 20.

At this point, the control with respect to each subset of imaging information CI follows the graphs shown in FIGS. 3A to 4C. The final score values are output by combining operations using the above graphs.

As one example, final score values Ex and Ey may be solved for using $$Ex = ws \times Es + wf \times Ef + wd \times Ed + wgx \times Egx$$

$$Ey = ws \times Es + wf \times Ef + wd \times Ed + wgy \times Egy$$

wherein the score value Ex is a value indicating the amount of motion blur to be added in the horizontal direction, and the score value Ey is a value indicating the amount of motion blur to be added in the vertical direction. In the above formulas, ws is a weighting coefficient applied to the score value Es based on the shutter speed S, wf is a weighting coefficient applied to the score value Ef based on the aperture value F, wd is a weighting coefficient applied to the score value Ed based on the focal length D, wgx is a weighting coefficient applied to the score value Egx based on the horizontal rotation GX, and wgy is a weighting coefficient applied to the score value Egy based on the vertical rotation GY.

By using weighted addition like that shown by way of example above, the score value generator 43 generates a score value Ex for the horizontal direction and a score value Ey for the vertical direction, and then outputs these values to the motion blur adder 30. On the basis of the supplied score values E (Ex and Ey in this case), the motion blur adder 30 adds motion blur as described hereinafter.

In this way, the motion region determining unit 40 first detects motion regions within a frame, and then generates score values for each motion region, with the values being adjusted on the basis of the imaging information CI.

For example, for still regions within a frame, the detection result (0) from the motion region detector 41 may be used for the score value E as-is (i.e., E=0), thereby enabling the motion blur adder 30 to recognize still regions as regions to which motion blur is not added.

For motion regions, the score value generator 43 may used the detection result (1) from the motion region detector 41 to perform computations on the basis of the imaging information CI, such as that given by the above formulas for Ex and Ey, and thereby adjust the score values in accordance with the imaging information CI.

In other words, for motion regions, the above values Ex and Ey solved for on the basis of the imaging information CI are taken to be the score values, and then passed to the motion blur adder 30 as information indicating the amount of motion blur to be added.

It should be appreciated that the calculations used to solve for the score values Ex and Ey as shown above are examples, and that a variety of other calculations are also conceivable. For example, weighted multiplication may be used.

Furthermore, although both horizontal and vertical score values Ex and Ey are solved for herein by using rotations detected by the gyro sensor 14 as horizontal and vertical rotations, a single score value E may also be computed without applying directionally-based distinctions.

In contrast, it is also conceivable to detect motion directions such as 45° and 135°, and then compute respective score values for the horizontal, vertical, 45°, and 135° directions.

Moreover, a score value may be computed without using all of the shutter speed information S, aperture value information F, focal length information D, and gyroscope rotation information GX (horizontal rotation) and GY (vertical rotation). In other words, a score value E may be computed using just a portion of the above.

In addition, rather than treating the detection results from the motion region detector as binary values (i.e., 0 or 1), the direction results may be treated as many-valued. In this case, the detection results may be 0 for still regions, with the value becoming larger for regions with a large amount of motion, and smaller for regions with a small amount of motion. Taking the detection results as M, the final score values may then be computed by multiplying the score values Ex and Ey solved for as above by the value of M.

Moreover, in the above example, the respective score values Es, Ef, Ed, Egx, and Egy are derived from the shutter speed information S, aperture value information F, focal length information D, and gyroscope rotation information GX and GY by means of functions, with the score values Es, Ef, Ed, Egx, and Egy being subsequently combined by weighted addition. However, it is also possible to compute a score value E by directly using the shutter speed information S, aperture value information F, focal length information D, and gyroscope rotation information GX and GY.

[2-3: Exemplary Configuration and Operation of Motion Blur Adder]

The motion blur adder 30 takes image data DD supplied by the imaging elements 13, and then adds motion blur on the basis of the score values E from the motion region determining unit 40. The exemplary configuration and operation of the motion blur adder 30 will now be described.

Figure 6:
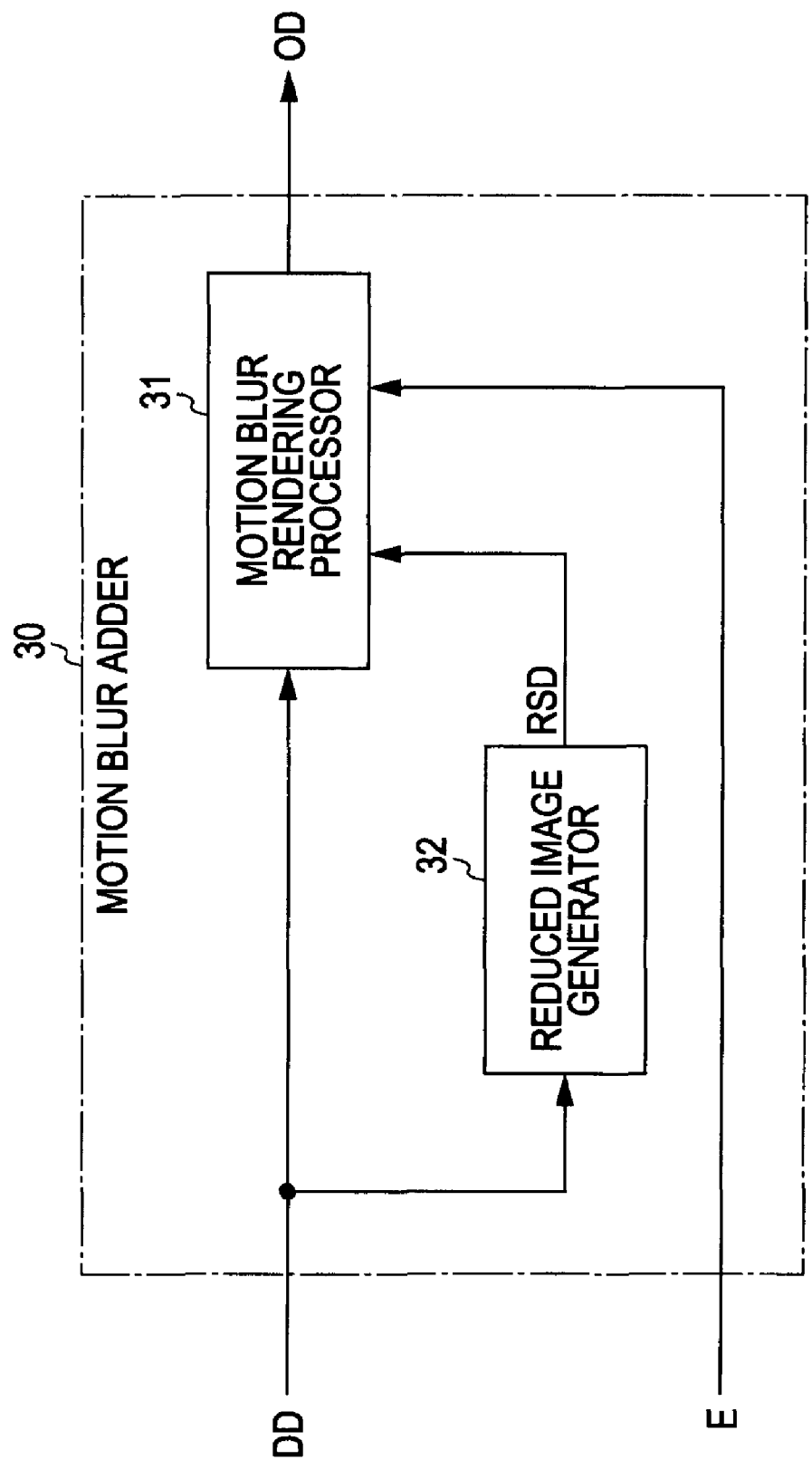
FIG. 6 is a block diagram of a motion blur adder in accordance with an embodiment of the present invention.

FIG. 6 illustrates an exemplary configuration of the motion blur adder 30. The motion blur adder 30 accepts the image data DD and the score values E from the motion region determining unit 40 as input, adds motion blur to the image data DD for each frame constituting the input motion images, and then outputs output image data OD where jerkiness has been reduced.

As shown in FIG. 6, the motion blur adder 30 is provided with a reduced image generator 32. The reduced image generator 32 adds motion blur to pixels that have been selected from the processed frame by filtering or similar processing, and then generates one or more reduced layers made up of the pixels obtained as a result.

In addition, the motion blur adder 30 is also provided with a motion blur rendering processor 31. The motion blur rendering processor 31 computes and outputs pixel values for each pixel constituting the output image. The motion blur rendering processor 31 computes pixel values on the basis of the score values E from corresponding pixels in the processed frame as well as corresponding pixels in the reduced layers generated by the reduced image generator 32.

Before describing the specific processing executed by each of the above components, the processing to add motion blur that is conducted by the motion blur adder 30 will be summarized.

Figure 7:
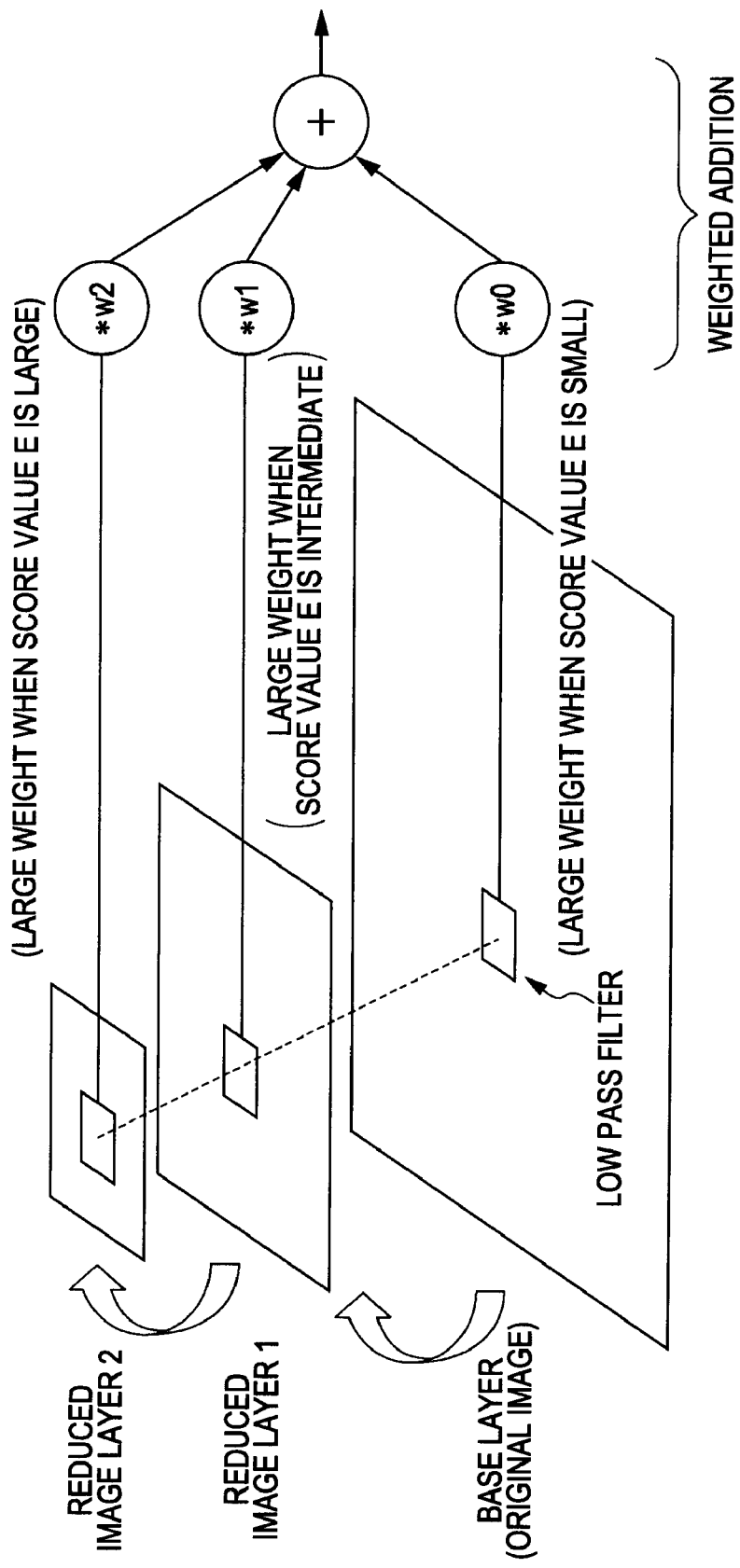
FIG. 7 is a diagram for explaining weighted addition using reduced images in accordance with an embodiment of the present invention.

The motion blur adder 30 adds a suitable amount of motion blur to each pixel using the reduced image generator 32 and the motion blur rendering processor 31, and then outputs images with reduced jerkiness. FIG. 7 summarizes the processing to add motion blur. More specifically, FIG. 7 summarizes the processing executed in the reduced image generator 32 and the motion blur rendering processor 31 shown in FIG. 6.

The original image (base layer) shown in FIG. 7 refers to the image data for a single processed frame, in the form of input image data DD. The reduced image generator 32 first executes spatial filtering processing (to be later described in detail) with respect to the original image expressing the processed frame, and creates a reduced layer 1 as a result. The reduced layer 1 is an image that has been reduced from the original image by a fixed ratio, wherein the pixel count has decreased.

Subsequently, the reduced image generator 32 executes similar spatial filtering processing with respect to the obtained reduced layer 1, and creates a reduced layer 2 as a result. Using the above procedure, the reduced image generator 32 uses recursive filter processing to generate a predetermined number of layers of reduced images (i.e., a number of reduced layers 1 to n).

Using the hierarchical stack of reduced images (i.e., the reduced layers 1 to n) generated by the above procedure, the motion blur rendering processor 31 generates and outputs images more natural to human eye, wherein motion blur has been adaptively added and jerkiness has been reduced.

For example, given the respective pixels in the original image shown in FIG. 7, the motion blur rendering processor 31 extracts pixel values from the base layer (i.e., the original image), the reduced layer 1, and the reduced layer 2, wherein the extracted pixel values are those of pixels positioned at locations corresponding to that of a particular pixel to which motion blur is to be added. The motion blur rendering processor 31 then executes weighted addition of the extracted pixel values according to a given rendering method.

Since the number of pixels differs for each layer, a pixel positioned at a location corresponding to that of the particular pixel targeted for motion blur might not exist in each reduced layer. In this case, interpolation processing (to be hereinafter described in detail) is used to interpolate and extract a pixel value from surrounding pixels.

The weighting coefficients (w0, w1, and w2) corresponding to the respective pixel values extracted from the base layer and each reduced layer are dependent on, and determined by, the score value E.

For example, when the score value E is large (i.e., when the amount of motion blur to be added is large), the weighting coefficient is increased for the pixel extracted from the reduced layer in the upper layer. In the example shown in FIG. 7, the above corresponds to increasing the weighting coefficient for the pixel extracted from reduced layer 2.

In contrast, when the score value E is small (i.e., when the amount of motion blur to be added is small), the weighting coefficient is increased for the pixel extracted from the reduced layer in the lower layer. In the example shown in FIG. 7, the above corresponds to increasing the weighting coefficient for the pixel extracted from the base layer.

As a result of such weighted addition, an image with reduced jerkiness is generated.

The specific processing conducted by the reduced image generator 32 will now be described. The processing conducted by the reduced image generator 32 involves executing spatial filtering with respect to input image data DD. Furthermore, similar spatial filtering is repeated with respect to the reduced image obtained as a result (even if the result of the first spatial filtering is not structured as an image, the plurality of pixels obtained as a result thereof is used). In so doing, a layered stack of reduced image data RSD is generated.

The above spatial filtering is conducted using pixel information for a region containing a plurality of pixels in the pre-filtering image. The image is then reduced by a fixed ratio (comparing images before and after processing), and an image with a reduced pixel count is generated. For this reason, each filtered pixel is output as an approximation of a corresponding region in the pre-filtering image.

Figure 8:
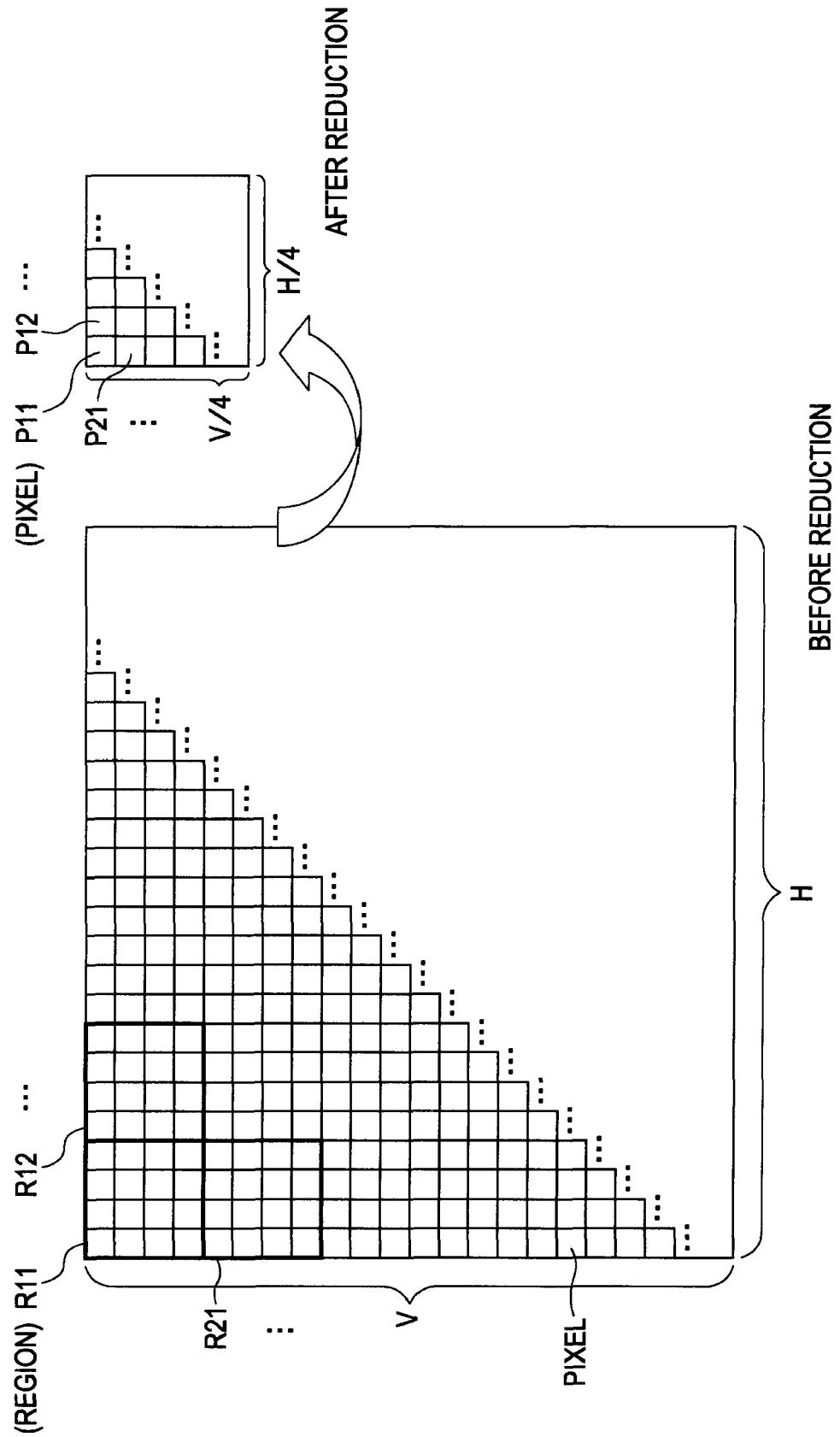
FIG. 8 is a diagram for explaining processing to generate reduced images in accordance with an embodiment of the present invention.

Hereinafter, the above spatial filtering will be described in detail, using a very basic filtering method by way of example. FIG. 8 illustrates the relationship between pixels before and after reduction in a specific example of filter processing used to generate reduced images.

In the example shown in FIG. 8, filtering is executed with respect to the pre-reduction image using a 4×4 pixel block herein labeled as the division region R11, and wherein a pixel P11 in the reduced image is output as a result. The pixels P12 and P21 are shown to exist in a similar relationship with the division regions R12 and R21. As a result, the pixel count of the reduced image becomes ¼ of that of the pre-reduction image in both the vertical and horizontal directions.

It should be appreciated that the use of 4×4 pixel blocks is merely one example. If similar processing is conducted using N×N pixels blocks, then a reduced image can be generated having a pixel count of 1/N in both the vertical and horizontal directions.

Assuming, by way of example, that a box filter or similar low pass filter is conducted with respect to the division region R11, the pixel values of nearby pixels are averaged, and a blurred pixel P1 is generated as a result.

If the reduced layer 1 shown in FIG. 7 is taken to be a reduced image obtained as above, then spatial filtering similar to that shown in FIG. 8 is executed with respect to the reduced layer 1, thereby generating the reduced layer 2.

In this case, by filtering the reduced layer 1 using 4×4 pixel division regions, each pixel in the reduced layer 2 is generated as a blurred pixel representing the average of the pixel values within a 16×16 pixel region in the original image.

After generating the reduced layer 2, it is also possible to generate a reduced layer 3 and subsequent layers as appropriate, using the same procedure. The process itself does not change, even if the number of layers is increased.

In this way, by executing spatial low-pass filtering with respect to an input image in the reduced image generator 32, a resolution image is generated as a result, and additional images even lower in resolution are generated by executing similar processing with respect to a generated low-resolution image. A layered stack of reduced image data RSD is thus generated by executing multiple-resolution filtering like the above.

As another example, a filter method for generating directionally-selected reduced images will now be described with reference to FIGS. 9 and 10. FIG. 8 illustrates division regions in the form of 4×4 pixel, square regions by way of example. However, the division regions whereby filtering is executed are not limited to being square.

On the contrary, problems related to image quality might occur if motion blur is added in the subsequent motion blur rendering process with a square or similar filter using 4×4 pixels as shown in FIG. 8. Such problems occur due to a phenomenon wherein, instead of just the desired motion blur, motion blur in the direction orthogonal to the motion and generated as a result of lowering the resolution becomes dominant.

For example, consider the case wherein it is desirable to add motion blur corresponding to motion in the horizontal direction. However, the reduced images that are used have been subjected to low-pass filtering in not only the horizontal direction (i.e., the direction of motion blur), but also the vertical direction. For this reason, the vertical resolution of the resulting image is decreased.

In other words, when reducing jerkiness by adding motion blur corresponding to the direction of motion shown in an image, blur is added in both the motion direction and the orthogonal direction, which may result in a visually unsuitable image.

In order to avoid such an event, filtering to generate reduced layers is conducted so as to take into account the direction of the motion blur to be finally added. With this method, reduced layers are prepared independently for each direction in which motion blur is to be added.

Figure 9:
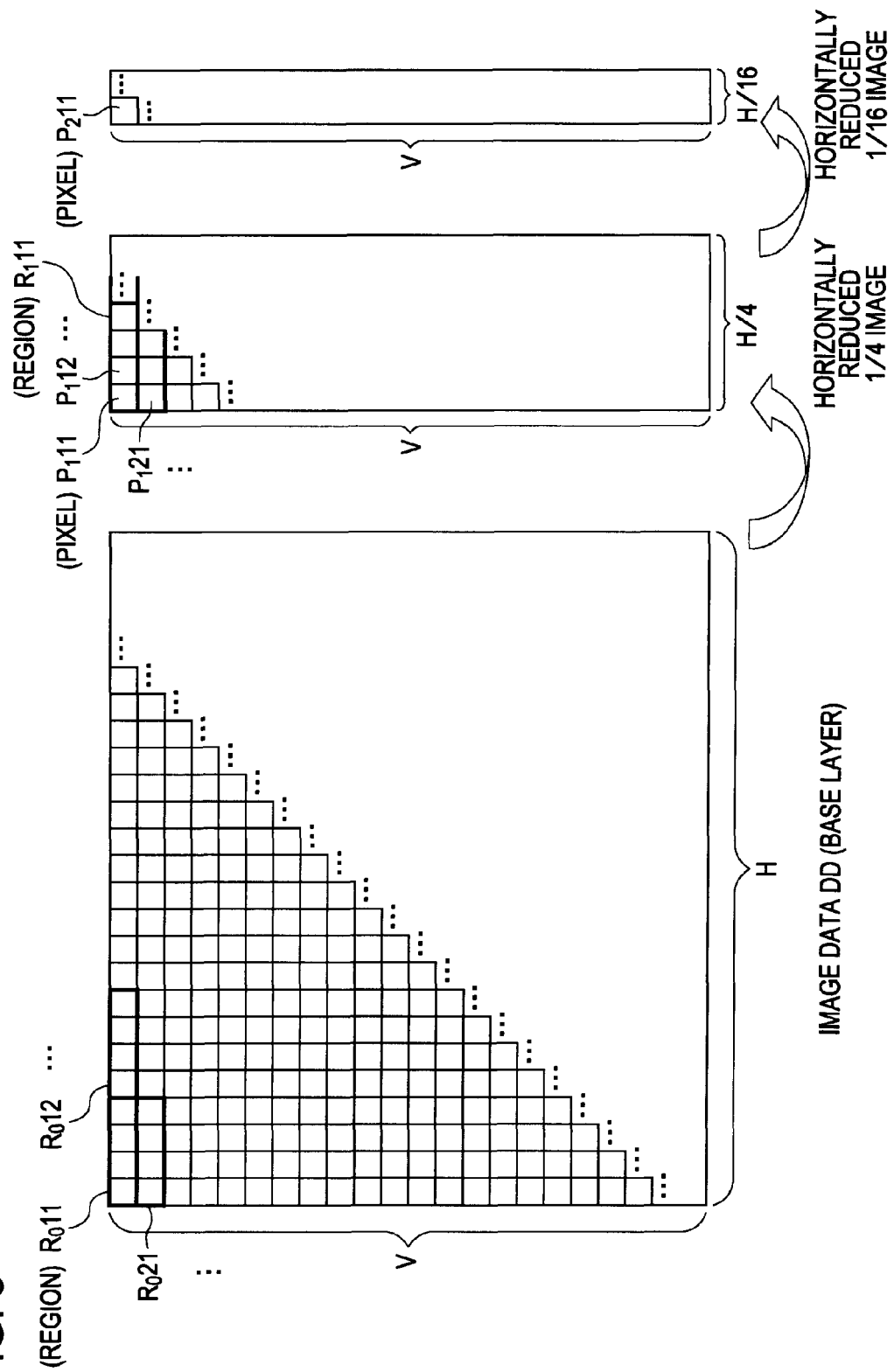
FIG. 9 is a diagram for explaining processing to generate horizontally reduced images in accordance with an embodiment of the present invention.

FIG. 9 illustrates the relationship between pixels before and after reduction in a specific example of filter processing for generating reduced images used to add motion blur in the horizontal direction. In FIG. 9, a 4×1 tap rectangular filter is applied to input image data DD (i.e., the base layer), thereby generating a horizontally reduced ¼ image whose pixel count is ¼ of the base layer in the horizontal direction, and unchanged in the vertical direction.

For example, filtering the regions $R_0 11$, $R_0 12$, and $R_0 21$ in the base layer results in the pixels $P_1 11$, $P_1 12$, and $P_1 21$ in the horizontally reduced ¼ image. It should be appreciated that use of 4×1 pixel regions is merely one example, and may be changed to suit the desired reduction ratio. The filter itself may be a box filter or similar low-pass filter, for example.

Similar filter processing is then executed with respect to the horizontally reduced ¼ image generated above, thereby generating a horizontally reduced ¹⁄₁₆ image whose pixel count is ¹⁄₁₆ of the base layer in the horizontal direction, and unchanged in the vertical direction.

For example, filtering the region $R_1 11$ in the horizontally reduced ¼ image results in the pixel $P_2 11$ in the horizontally reduced ¹⁄₁₆ image. In this way, a multi-layered stack of images reduced in the horizontal direction only is generated. The images can then be used to add motion blur in the horizontal direction, while also preventing resolution loss in the vertical direction.

Figure 10:
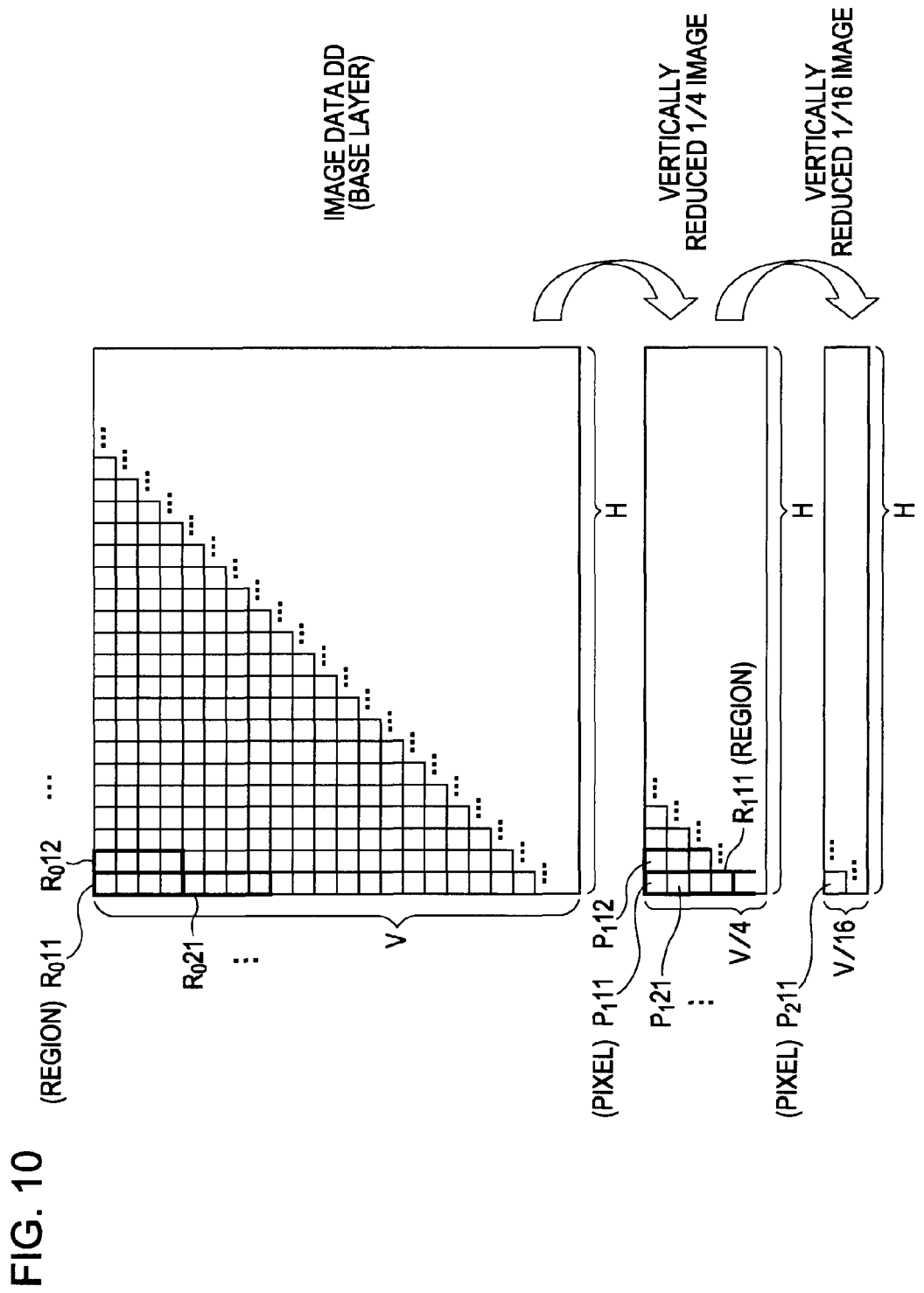
FIG. 10 is a diagram for explaining processing to generate vertically reduced images in accordance with an embodiment of the present invention.

FIG. 10 illustrates the relationship between pixels before and after reduction in a specific example of filter processing for generating reduced images used to add motion blur in the vertical direction. Similarly to FIG. 9, FIG. 10 shows a 1×4 tap rectangular filter being first applied to input image data DD (i.e., the base layer), thereby generating a vertically reduced ¼ image whose pixel count is ¼ of the base layer in the vertical direction, and unchanged in the horizontal direction. The filter itself may be a box filter or similar low-pass filter, for example. For example, filtering the regions $R_0 11$, $R_0 12$, and $R_0 21$ in the base layer results in the pixels $P_1 11$, $P_1 12$, and $P_1 21$ in the vertically reduced ¼ image.

Similar filter processing is then executed with respect to the vertically reduced ¼ image generated above, thereby generating a vertically reduced ¹⁄₁₆ image whose pixel count is ¹⁄₁₆ of the base layer in the vertical direction, and unchanged in the horizontal direction. For example, filtering the region $R_1 11$ in the vertically reduced ¼ image results in the pixel $P_2 11$ in the vertically reduced ¹⁄₁₆ image. In this way, a multi-layered stack of images reduced in the vertical direction only is generated. The images can then be used to add motion blur in the vertical direction, while also preventing resolution loss in the horizontal direction.

The above describes the vertical and horizontal directions by way of example, but it should be appreciated that filters for generating reduced images in other directions may also be adopted, such as filters for the diagonals 45° and 135°, or other arbitrary angles.

In the method described thus far, reduced images are generated independently for adding motion blur in respective directions. For this reason, in the subsequent motion blur rendering process, pixels are adaptively selected or composited from reduced images in respective directions, in accordance with the direction of the motion blur to be added to each particular pixel. A method for the above will be given in the description of the motion blur rendering processor 31.

The foregoing thus describes filtering for generating reduced layers while taking into account the direction of the motion blur to be added. In order to describe the above process in further detail, a specific exemplary configuration will now be given, and description hereinafter will successively make use thereof. The specific example is described below.

Specific Example

Parameters 1

Directions of reduced image generation: horizontal, vertical

No. of reduced image layers: three horizontal and three vertical (i.e., up to the reduced layer 3)

Direction of generated motion blur: the greater of the absolute values of the horizontal and vertical translational speeds at the time of motion blur rendering (to be later described in detail)

Post-filter reduction ratios (with respect to pre-filter image):

Reduced layer 1: ¼
Reduced layer 2: ¹⁄₁₆
Reduced layer 3: ¹⁄₆₄

Given the above specifications, the maximum amount of motion blur that can be added is equivalent to a translation of ±64 pixels in the horizontal and vertical directions, respectively.

Figure 11:
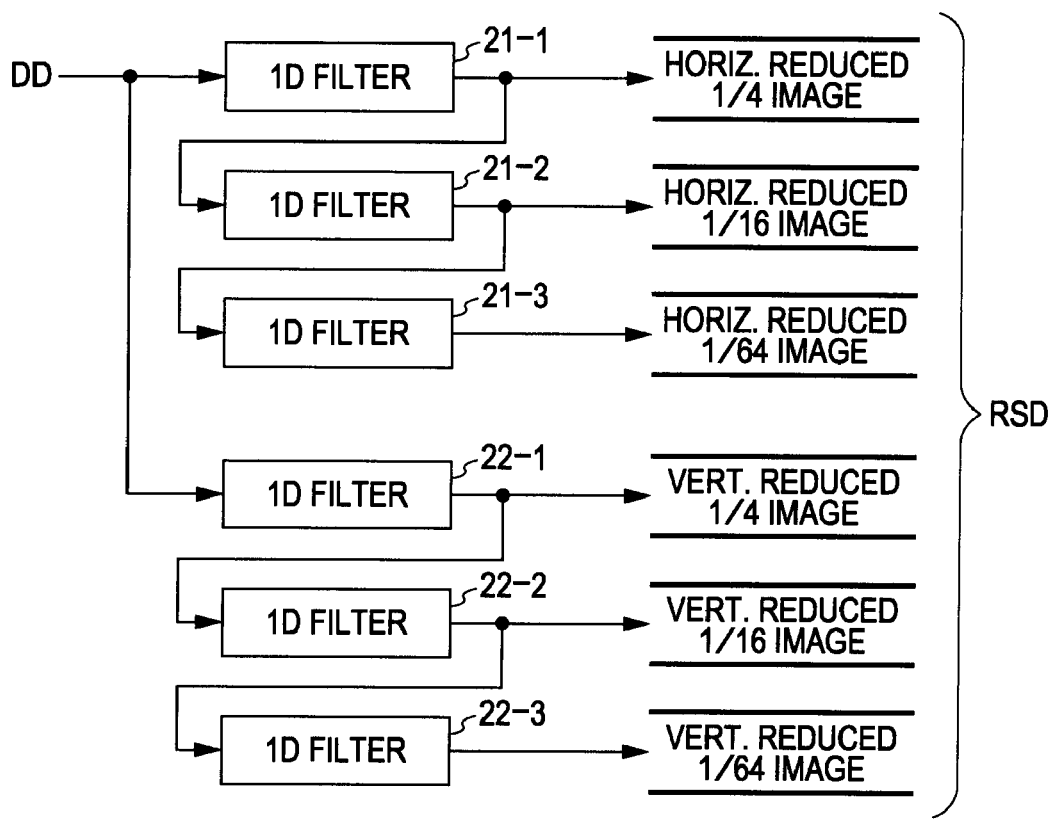
FIG. 11 is a diagram for explaining processing conducted by a reduced image generator in accordance with an embodiment of the present invention.

FIG. 11 illustrates an exemplary configuration of the reduced image generator 32 given settings indicated by the above parameters 1. FIG. 11 illustrates a process flow in the case where processing to generated reduced layers is executed using one-dimensional filters in the horizontal and vertical directions, respectively. The reduced layers respectively generated are then output as the reduced image data RSD.

More specifically, input image data DD is filtered by a 1D filter 21-1 to generate a horizontally reduced ¼ image. The result from the 1D filter 21-1 is additionally filtered by a 1D filter 21-2 to generate a horizontally reduced ¹⁄₁₆ image. The result from the 1D filter 21-2 is additionally filtered by a 1D filter 21-3 to generate a horizontally reduced ¹⁄₆₄ image.

Meanwhile, the input image data DD is also filtered by a 1D filter 22-1 to generate a vertically reduced ¼ image. The result from the 1D filter 22-1 is additionally filtered by a 1D filter 21-2 to generate a vertically reduced ¹⁄₁₆ image. The result from the 1D filter 221-2 is additionally filtered by a 1D filter 22-3 to generate a vertically reduced ¹⁄₆₄ image. The six sets of reduced image data RSD obtained as a result of the above are then output.

The processing conducted by the 1D filters (21-1 to 22-3) shown in FIG. 11 is herein taken to be recursive filter processing realized by software-based computations and illustrated as a process flow expressed using blocks. However, the above configuration may also be taken to be a hardware configuration. The following FIG. 12 is similar.

Figure 12:
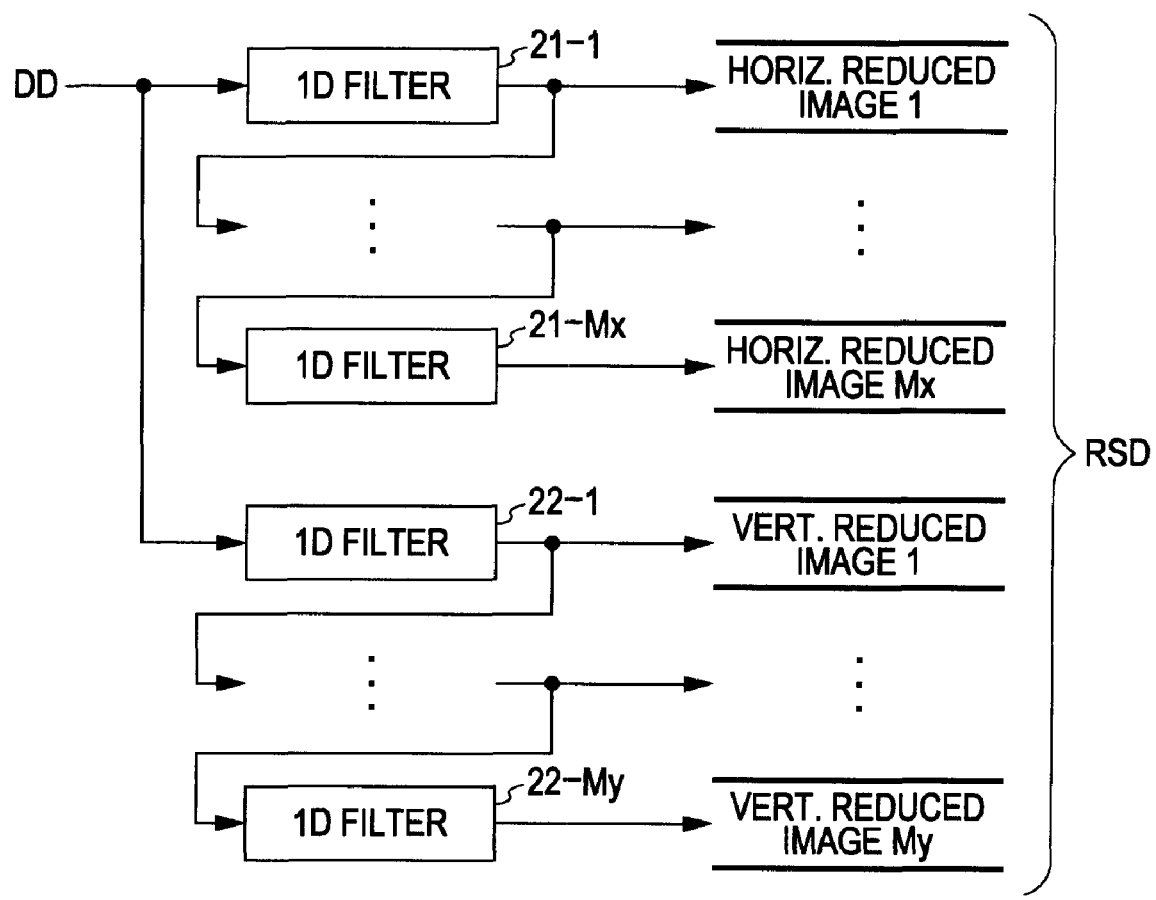
FIG. 12 is a generalized diagram for explaining processing conducted by a reduced image generator in accordance with an embodiment of the present invention.

FIG. 12 is an extended generalization of the process flow shown in FIG. 11. Given the settings indicated by the above parameters 1, the number of layers to be generated in the horizontal and vertical directions is fixed at three. However, FIG. 12 shows a generalized process flow not limited to the above parameter, wherein the number of horizontally reduced layer layers is expressed as Mx, and the number of vertically reduced layer layers is expressed as My.

By means of the 1D filters 21-1 to 21-Mx, Mx layers of horizontally reduced images are generated. Likewise, by means of the ID filters 22-1 to 22-My, My layers of vertically reduced images are generated. The resulting images are then output as the reduced image data RSD.

Furthermore, although omitted from FIG. 12 and the description herein, it is also possible to extend the configuration such that the directions of reduced image generation include not only horizontal and vertical, but also diagonal directions.

The foregoing thus describes a processing sequence related to a method for independently generating reduced images used to add motion blur in respective directions. Hereinafter, an actual filter used when generating reduced images for respective directions will be described.

In the description thus far, the use of a 4-tap box filter is given by way of example. This is because a 4-tap box filter is one of the most easily realized methods when using a 4-pixel block filter corresponding to a reduction ratio of ¼. When the underlying principle behind motion blur is taken into account, a box filter, being equivalent to a moving average filter, should closely resemble actual motion blur in principle. However, it is also possible to modify the filter in order to improve the image quality that is ultimately obtained.

Figure 13:
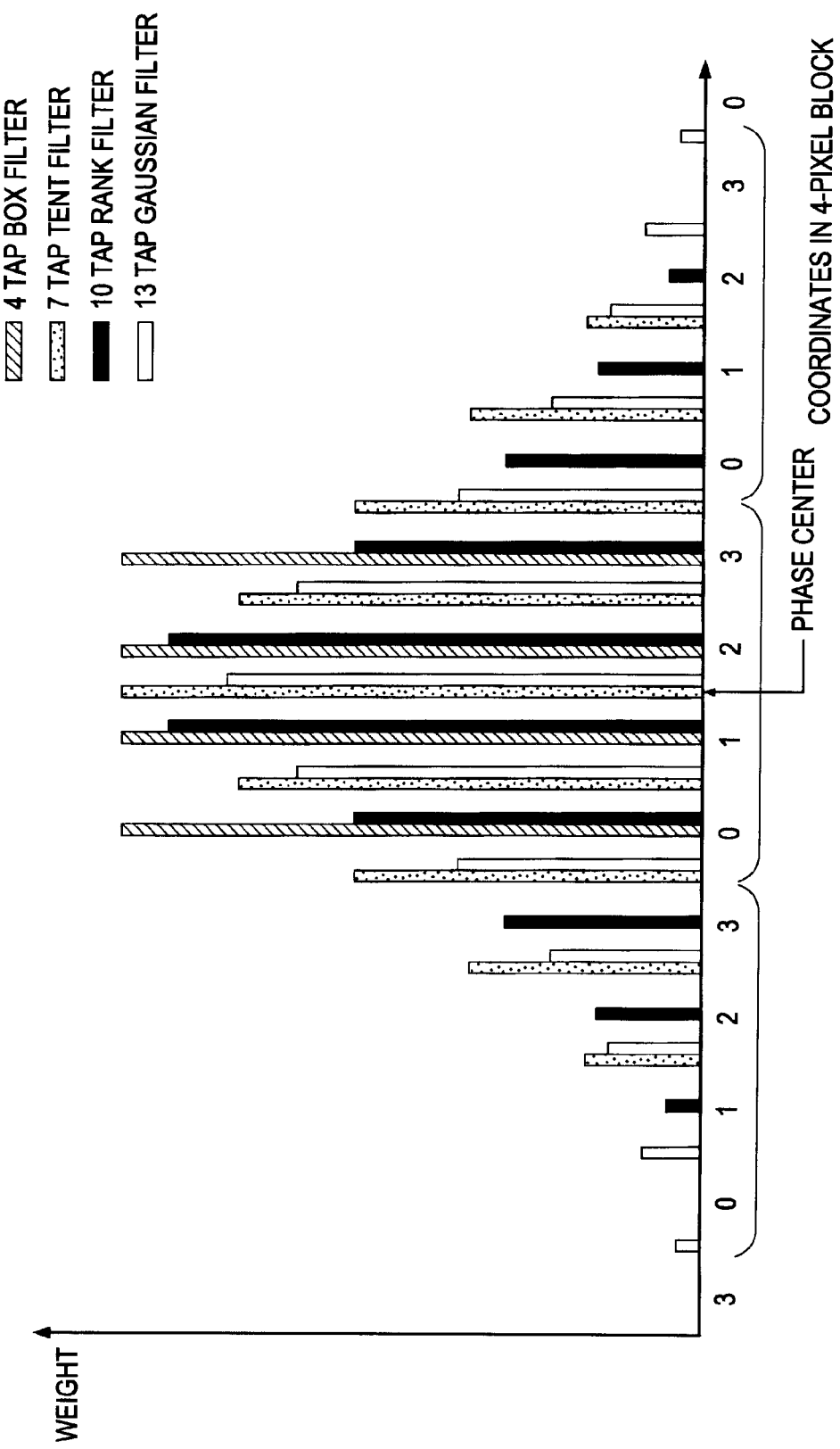
FIG. 13 is a diagram for explaining a filter in a reduced image generator in accordance with an embodiment of the present invention.

FIG. 13 illustrates specific examples of filter shapes used for reduced image generation processing. Given the parameters 1 described earlier, the filter is assumed to reduce an image to ¼ size in either the horizontal or vertical direction. The horizontal axis indicates coordinates for the case wherein sets of 4 pixels are considered to be single blocks, while the vertical axis indicates the weight by which individual pixels are multiplied in the filter.

In addition to a 4-tap box filter, FIG. 13 also illustrates a 7-tap tent filter, a 10-tap rank filter, and a 13-tap Gaussian filter by way of example, and also shows that it is possible to adopt an FIR low-pass filter if available.

When the reduction ratio by the reducing filter is 1/N, the filter tap number is N-tap or greater. (For example, a 4-tap filter is used for a reduction ratio of ¼, wherein 1 pixel is output with respect to 4 input pixels.) By further increasing the number of taps, improved image quality can be expected. This is because an increased number of taps alleviates image quality loss due to the folding phenomenon, which is more likely to occur with lower tap numbers. Furthermore, in addition to increasing the filter tap number, pixels belonging to adjacent division regions become overlapped and filtered, but this does not pose a problem.

Figure 14:
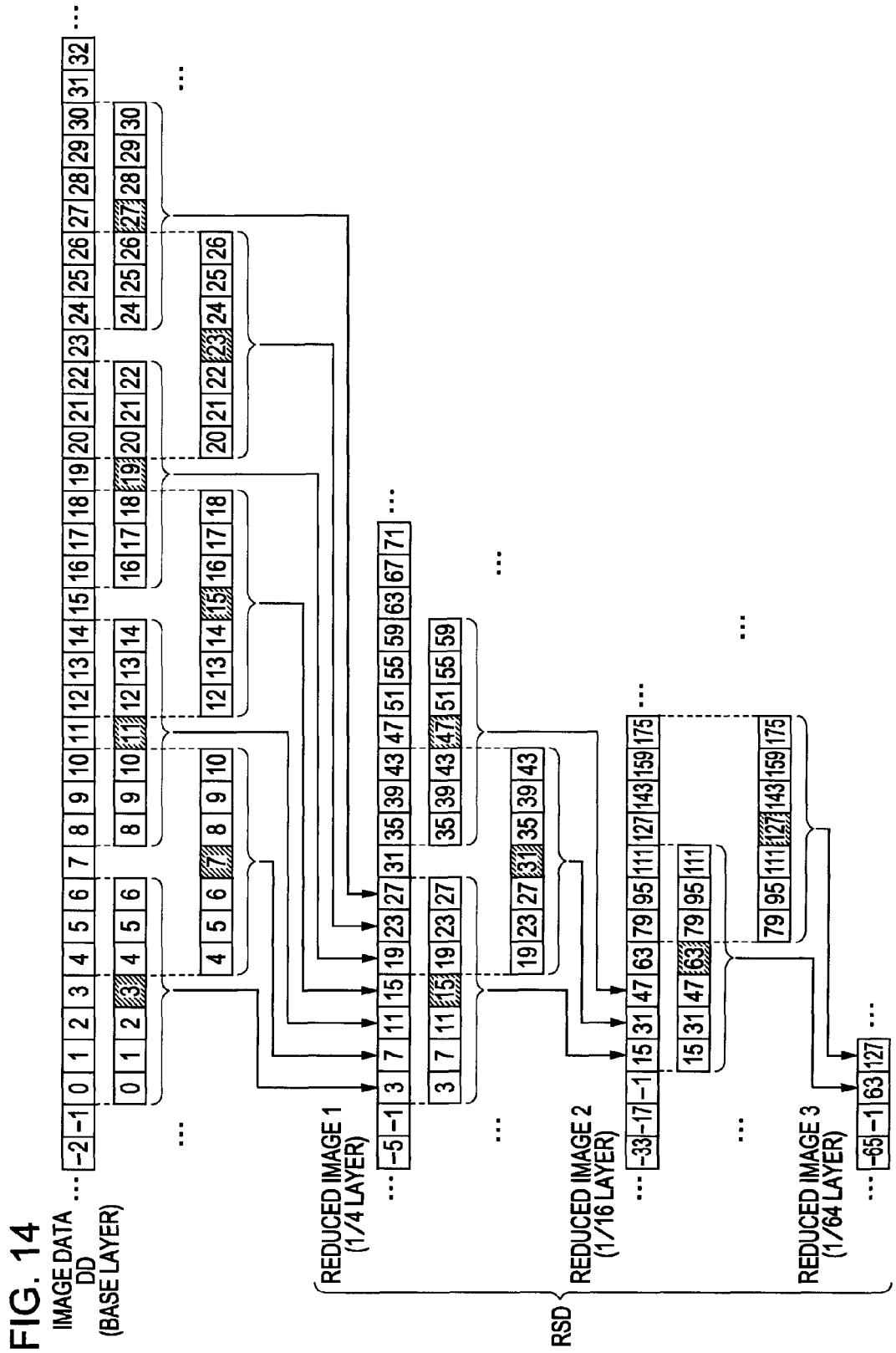
FIG. 14 is a diagram for explaining a reduced image generator in accordance with an embodiment of the present invention.

FIG. 14 is a diagram for explaining the positional relationship of pixels in respective reduced images used when filtering. The way in which pixels from each reduced image are subjected to weighted addition in order to compute the pixel value of an output pixel and generate a horizontally reduced image will now be described with reference to FIG. 14. A filter tap number of 7 is used herein by way of example. Since vertically reduced images can also be generated according to same procedure, further description of the vertical case is omitted.

In FIG. 14, the pixels in each reduced image are numbered. Hereinafter, these numbers will be used to designate particular pixels in reduced images of particular layers. For example, the 79th pixel in the ¹⁄₁₆ reduced image is represented as L2(79). Pixels in the input image data DD (i.e., the base layer) are expressed as L0(n), where n is a pixel number.

The pixel numbers in each reduced image correspond to positions on the base layer, and are created by executing filtering whose phase is centered about the shaded pixels in each reduced layer. For example, the pixel L1(7) in the first, ¼ reduced layer is generated as a result of applying a 7-tap filter to the pixels L0(4) to L0(10) on the base layer.

In this way, the filter is shifted by 4 pixels in the respective reduced images during execution. In so doing, no problem is posed even if the pixels used overlap with those of the adjacent filter, and the reduced layer for the next layer (being reduced by ¼ as a result of applying the filter) is created. Obviously, it is also possible to realize different reduction ratios with a similar method.

The specific processing conducted by the motion blur rendering processor 31 will now be described. The motion blur rendering processor 31 takes the input image data DD as well as the layered stack of reduced images generated by the reduced image generator 32, and uses the images to compute the value of each pixel in an output image that contains motion blur.

Figure 15:
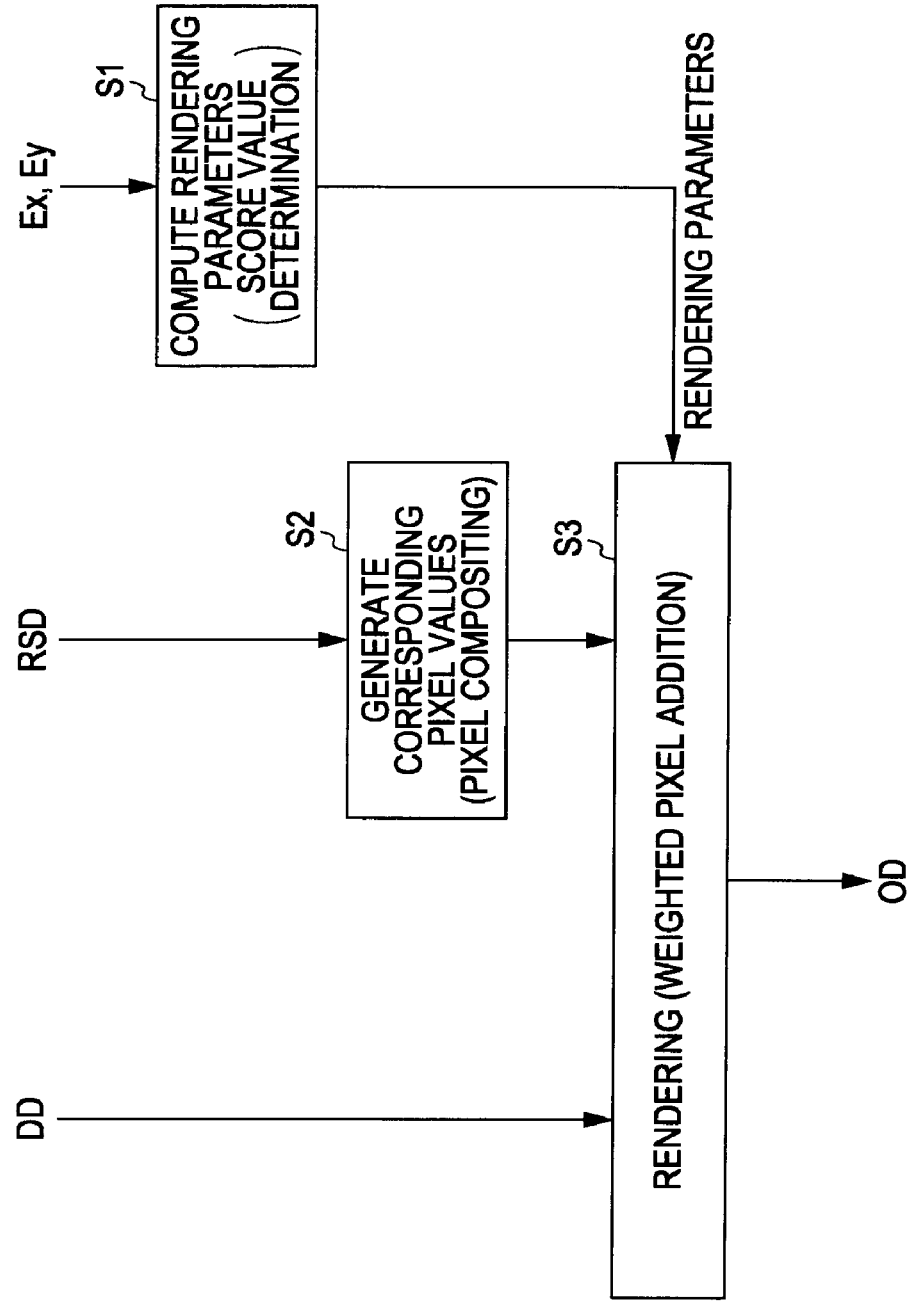
FIG. 15 is a diagram for explaining processing conducted by a motion blur adder in accordance with an embodiment of the present invention.

FIG. 15 is a schematic diagram illustrating a process flow for motion blur rendering. Image data DD, reduced image data RSD, and score values E (such as a horizontal score value Ex and a vertical score value Ey) are input into the motion blur rendering processor 31, and output image data OD wherein a suitable amount of motion blur has been added to each pixel is then output.

First, rendering parameters are extracted from the score values Ex and Ey (S1). The rendering parameters specify the motion blur to add to particular pixels (i.e., the direction of the motion blur, and the number of pixels across which the motion blur translates).

In other words, the rendering parameters are data specifying the amount of weight by which to multiply individual pixels in the image data DD and the reduced image data RSD in the weighted addition of the subsequent rendering process. The rendering parameters will be later described more fully by means of a specific example.

Pixel compositing is then conducted with respect to the reduced image data RSD, wherein pixel values are generated by interpolation of pixels in each reduced image that positionally correspond to a particular pixel in the image data DD (S2). The reasoning behind the above processing and a specific example thereof will be later given in detail.

Finally, rendering is conducted, wherein weights are respectively applied to a particular pixel in the image data DD as well as to individual composite pixels generated from the reduced image data RSD. The weighted pixels are then added together to compute the pixel value of the output pixel corresponding to the particular pixel in the image data DD. Weighting information is one of the rendering parameters input earlier.

Figure 16:
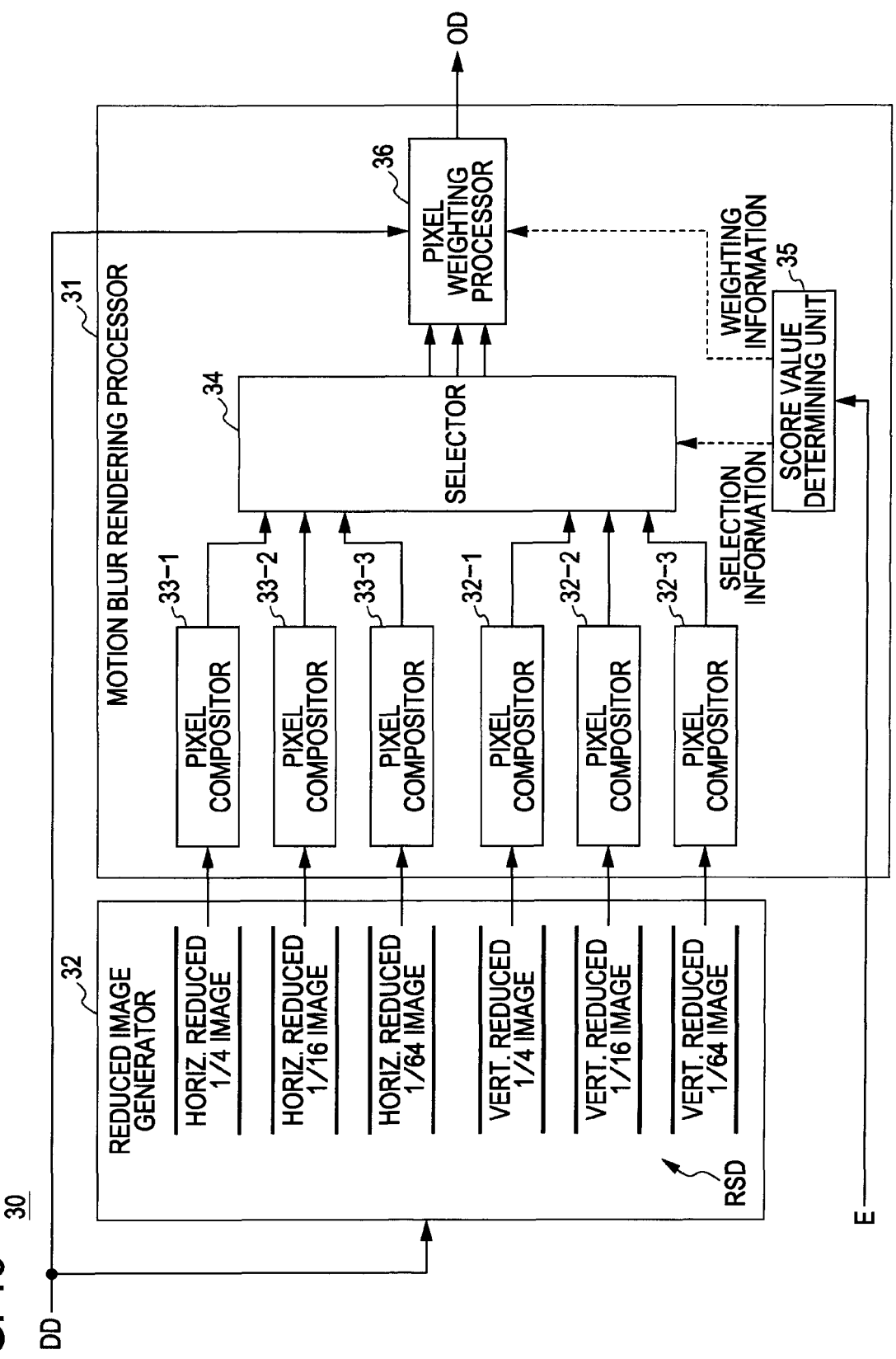
FIG. 16 is a block diagram of the configuration of a motion blur adder in accordance with an embodiment of the present invention.

FIG. 16 is a diagram of the configuration of the motion blur adder 30, illustrating in detail the processing blocks of the motion blur rendering processor 31 when given the parameters 1 specified earlier. As shown in FIG. 16, the reduced image data RSD created by the reduced image generator 32 contains three layers of reduced images for the horizontal and vertical directions, respectively.

In the motion blur rendering processor 31, when a particular pixel to be processed from the image data DD is input, pixels from the three layers of horizontally reduced images are respectively input into pixel compositors 33-1 to 33-3 at the same time, and processing to compute composite pixel values (to be hereinafter described) is conducted.

In addition, when a particular pixel to be processed from the image data DD is input, pixels from the three layers of vertically reduced images are respectively input into pixel compositors 32-1 to 32-3 at the same time, and processing to compute composite pixel values (to be hereinafter described) is conducted.

The composite pixels corresponding to each reduced image and computed by the pixel compositors 33-1 to 33-3 and 32-1 to 32-3 are then input into a selector 34.

Meanwhile, the score values E (in this case, Ex and Ey) are input into a score value determining unit 35. The parameters 1 specified earlier are parameters whereby motion blur is selectively added to each pixel in one of either the horizontal direction or the vertical direction. Consequently, on the basis of the score values Ex and Ey, the score value determining unit 35 generates selection information specifying whether motion blur is to be added in the horizontal direction or the vertical direction, as well as weighting information specifying the weights by which to multiply each composite pixel value for given directions of motion blur. The selection information is subsequently supplied to the selector 34, while the weighting information is supplied to a pixel weighting processor 36.

On the basis of the selection information input from the score value determining unit 35, the selector 34 selects pixel values from among the composite pixel values for only one of either the horizontal direction or the vertical direction, and then outputs the selected pixel values to the pixel weighting processor 36. In other words, when given the parameters 1, six pixel values are input into the selector 34, and three pixel values are output.

The particular pixel to be processed from the input image data DD that was previously input is then input into the pixel weighting processor 36. Additionally, the respective pixels values that were directionally selected from among the composite pixel values are also input, as described above. Weighting information corresponding to each pixel value is also input from the score value determining unit 35. On the basis of the weighting information, the pixel weighting processor 36 executes weighted pixel addition to be later described in detail, and thereby computes an output pixel value.

Figure 17:
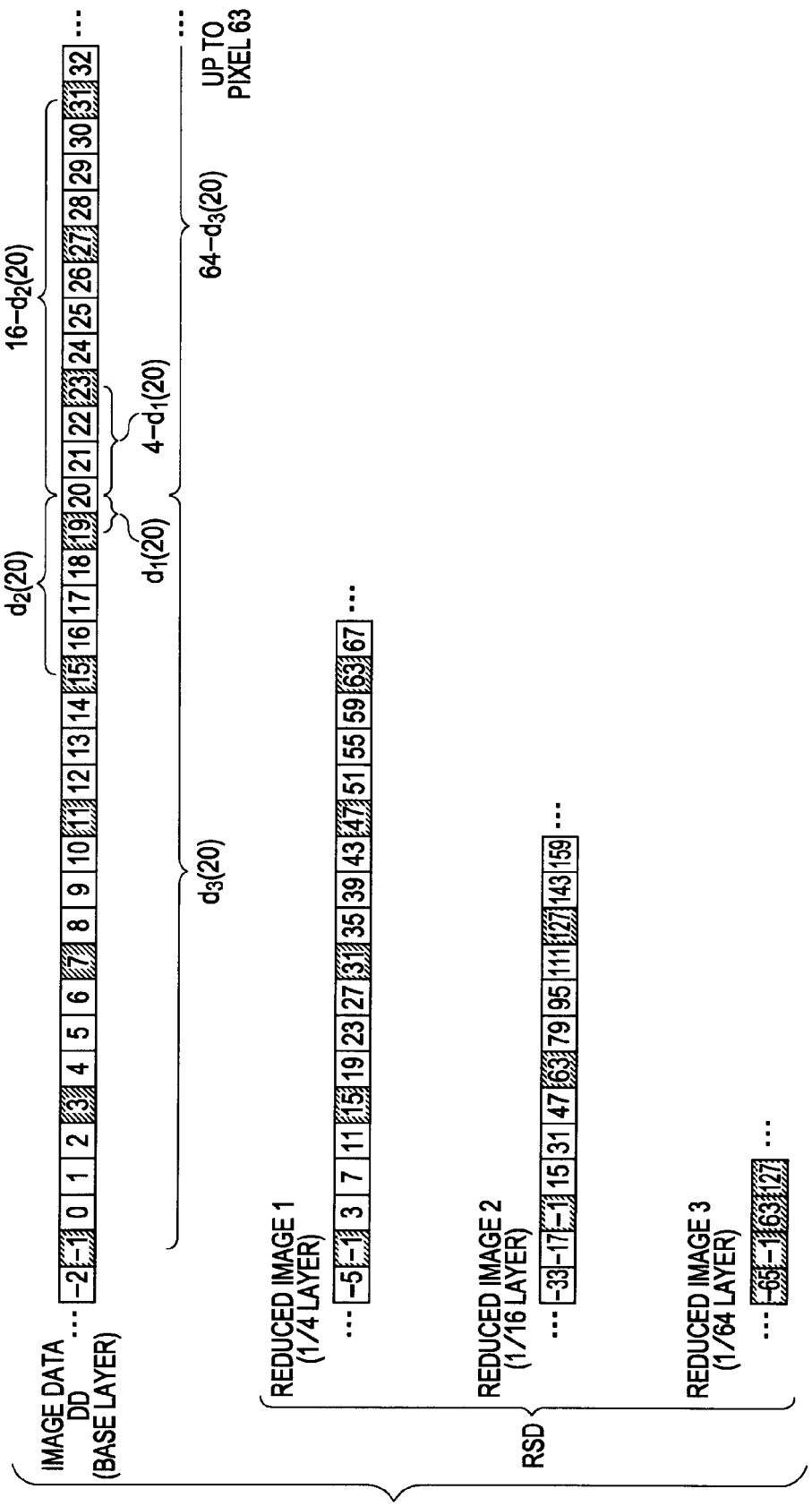
FIG. 17 is a diagram for explaining pixel compositing and pixel weighting in accordance with an embodiment of the present invention.

The processing conducted by the pixel compositors 33-1 to 33-3 and 32-1 to 32-3 will now be described with reference to FIG. 17. FIG. 17 is a diagram for explaining a specific example of pixel compositing and weighted pixel addition. Individual pixels in the image data DD and the reduced image data RSD are illustrated similarly to those shown in FIG. 14.

Although the computation of composite pixel values conducted by the pixel compositors 33-1 to 33-3 and 32-1 to 32-3 is performed with respect to pixels input from horizontally and vertically reduced images, respectively, FIG. 17 just illustrates the case wherein motion blur is applied in the horizontal direction (i.e., just the pixel compositors 33-1 to 33-3). However, the description hereinafter may be similarly applied to the vertical case (i.e., the pixel compositors 32-1 to 32-3).

First, the reasoning behind the computation of composite pixel values will be given. As described earlier, the subsequent pixel weighting processor 36 respectively applies weights to both a particular pixel in the image data DD as well as respective composite pixels generated from the reduced image data RSD. The weighted pixels are then added together to compute the pixel value of an output pixel that corresponds to the particular pixel in the image data DD. In some cases, however, pixels corresponding to the particular pixel in the image data DD do not exist in each reduced image. For this reason, it is preferable to compute a corresponding pixel in each reduced image by interpolation.

In FIG. 17, for example, there do not exist pixels in the respective reduced images that positionally correspond to the pixel L0(20) in the image data DD. This is because when the image data DD is filtered and the first, ¼ reduced image is generated, the pixel L0(20) is not a phase center of the filter. As a result, a positionally corresponding pixel does not exist in the ¼ reduced layer and subsequent layers.

For this reason, some type of interpolation is used to estimate pixel values L1(20)', L2(20)', and L3(20)' in the reduced images that correspond to the particular pixel in the image data DD. Herein, the case wherein a linear interpolation method is used to compute L1(20)', L2(20)', and L3(20)' is considered by way of example.

At this point, the distances between a particular pixel and the coordinates of a pixel in the input image data DD that is used as a phase center when generating respective reduced images can be expressed as $d_1(20)$, $d_2(20)$, and $d_3(20)$, as shown in FIG. 17. The above distances are measured to the closest phase center pixel existing to the left of the current pixel. In the present case, the composite pixel values $L_1(20)'$, $L_2(20)'$, and $L_3(20)'$ existing in respective reduced images and corresponding to the pixel $L_0(20)$ in the input image data DD can be expressed as:

(Equation 1)

Example of composite pixel in the ¼ reduced image $$L_1(20)' = \frac{4 - d_1(20)}{4} * L_1(19) + \frac{d_1(20)}{4} * L_1(23)$$

Example of composite pixel in the 1/16 reduced image $$L_2(20)' = \frac{16 - d_2(20)}{16} * L_2(15) + \frac{d_2(20)}{16} * L_2(31)$$

Example of composite pixel in the 1/64 reduced image $$L_3(20)' = \frac{64 - d_3(20)}{64} * L_3(-1) + \frac{d_3(20)}{64} * L_3(63)$$

In general, the pixel value $L_K(N)'$ of a composite pixel existing in the Kth reduced image (a 1/R reduced layer) and corresponding to the Nth pixel $L_0(N)$ in the input image data DD can be expressed as:

$$L_K(N)' = \frac{R - d_k(N)}{R} * L_K(\langle N \rangle_K) + \frac{d_k(N)}{R} * L_K(\langle N \rangle_K > +1) \quad \text{(Equation 2)}$$

wherein $\langle N \rangle_K$ is the phase center pixel closest to N in the Kth reduced image and existing to the left of the corresponding Nth pixel in the input image data DD.

As shown in Eq. 2, linearly interpolated pixel values can be computed by means of 2-tap filtering using two pixels existing in each reduced layer (i.e., the closest two pixels positionally corresponding to the particular pixel in the image data DD). Although a method for computing composite pixel values using linear interpolation is shown herein, it is also possible to compute composite pixel values using spline interpolation or other, higher-order method as the interpolation method.

The processing executed in the score value determining unit 35 will now be described. In order to selectively add motion blur to each pixel in one of either the horizontal direction or the vertical direction in accordance with the parameters 1, the score value determining unit 35 uses the previously input score values Ex and Ey as a basis for generating selection information specifying whether motion blur is to be added in the horizontal direction or the vertical direction, as well as weighting information specifying the weights by which to multiply each composite pixel value for given directions of motion blur.

The method whereby the score value determining unit 35 selects the direction in which to add motion blur may involve comparing the input score values Ex and Ey. More specifically, the score value determining unit 35 compares the magnitude of motion in both the horizontal and vertical directions, and then decides to add motion blur in the direction of greater motion. In other words, when Ex≧Ey: add horizontal blur; and when Ex<Ey: add vertical blur.

On the basis of the above, the score value determining unit 35 outputs selection information specifying the direction in which to add motion blur to the selector 34. In the present example, the size of the information sent to the selector 34 may be one bit for each pixel to which motion blur is to be added.

Another role of the score value determining unit 35 is to compute information on the weights by which to multiply each composite pixel value, and then output the computed information to the pixel weighting processor 36. The method for determining the weighting will be hereinafter clarified by way of example in the detailed description of the pixel weighting processor 36.

The processing executed in the pixel weighting processor 36 will now be described. The pixel weighting processor 36 receives a particular pixel $L_0(N)$ of the image data DD as input, together with respective composite pixels generated from each reduced image for one of either the horizontal direction or the vertical direction.

Hereinafter, it will be assumed that three layers of reduced images for the horizontal and vertical directions in accordance with the parameters 1 are generated, and furthermore that the direction in which to add motion blur is determined by the selector 34 to be the horizontal direction. Herein, the composite pixels generated from the pixels in each horizontally reduced image are expressed as $L_1(N)'$, $L_2(N)'$, and $L_3(N)'$.

At this point, output pixel values $L_{out}(N)$ are similarly computed on the basis of weighting information input from the score value determining unit 35, wherein linear weighted addition of the above pixel values is conducted according to $$L_{out}(N) = w_0 * L_0(N) + w_1 * L_1(N)' + w_2 * L_2(N)' + w_3 * L_3(N)' \quad \text{(Equation 3)}$$

wherein $w_0$ to $w_3$ are the weights by which each pixel value is multiplied. More generally, the above can be expressed as $$L_{out}(N) = \sum_{K=0}^{M} w_K * L_K(N)' \quad \text{(Equation 4)}$$

wherein M is the number of reduced images generated in a given direction, and wherein $L_0(N) = L_0(N)'$.

From the input score values Ex and Ey, the score value determining unit 35 computes weights $w_k$ for each reduced image and with respect to each pixel in the image data DD. The score value determining unit 35 then provides the computed weights to the pixel weighting processor 36.

The generation of weights applied to each pixel value herein assumes the use of the parameters 1. An exemplary method for determining the weights $w_0$ to $w_3$ will now be given.

Given score values Ex and Ey positionally corresponding to a particular pixel, the larger of the component values is designated V. Subsequently, these component values of Ex and Ey are successively distributed on the basis of the following weight determining rules.

Step 1: $w_0=1$; if $V \leq 1$, then set $w_1=0$, $w_2=0$, $w_3=0$, and go to step 5.

Step 2: if $V-w_0>4-1$, then set $w_1=3$. Otherwise, set $w_1=V-w_0$, $w_2=0$, $w_3=0$, and go to step 5.

Step 3: if $V-(w_0+w_1)>16-4$, then set $w_2=12$. Otherwise, set $w_2=V-(w_0+w_1)$, $w_3=0$, and go to step 5.

Step 4: $w_3=V-(w_0+w_1+w_2)$.

Step 5: normalize by dividing each value of $w_0$ to $w_3$ by V.

It should be appreciated that the above is merely one example, and that the present invention is not limited thereto. In particular, since a division operation is produced in step 5, processing costs are increased when realizing by means of hardware. For this reason, it is possible to reduce processing costs by defining respective weights $w_k$ with respect to V in table form.

FIG. 18 illustrates an example of such a weighting information table. In the table shown in FIG. 18, the first column indicates the score value E (Ex or Ey) for the selected direction, while the second to the fifth columns indicate weight values by which to multiply respective pixels extracted from each reduced layer.

The numeric values given in FIG. 18 are merely given by way of example and are not limiting. However, smaller score values E preferably result in larger weight values in upper layers (i.e., the base layer and the reduced layer 1), while in contrast, larger absolute vector values preferably result in larger weight values in lower layers (i.e., the reduced layers 2 and 3).

In this way, weighting information is generated in the score value determining unit 35 and then supplied to the pixel weighting processor 36. Subsequently, the pixel weighting processor 36 conducts the linear weighted addition given by Eq. 3, for example, and thereby computes output pixel values $L_{out}(N)$. The pixel weighting processor 36 thus yields output image data OD wherein jerkiness has been reduced.

[2-4: Summary and Conclusions]

The foregoing thus describes a motion image imaging apparatus 200 in accordance with the first embodiment of the present invention. According to the above embodiment, motion images with reduced jerkiness that appears more natural to the human eye is output.

More particularly, in the present embodiment, motion blur is added to unit images (image data for single frames, for example) in image data DD that has been imaged and input. The motion blur is added on the basis of a per-region still/motion determination, as well as imaging information CI expressing parameters whereby the unit images were imaged. The still/motion determination in the motion region determining unit 40 is processing to determine, on a per-region basis, whether a given region in a frame (i.e., a pixel unit or pixel block unit made up of a plurality of pixels) is a motion region or a still region. It is possible to conduct the still/motion determination using simple processing, such as by comparison with adjacent frames, for example.

Score values E that indicate the amount of motion blur to be added are generated by using the imaging information CI, which may include shutter speed information, aperture value information, focal length information, and gyroscope rotation information (e.g., information indicating horizontal and vertical motion of the imaging apparatus), for example.

More specifically, score values E that cause a suitable amount of motion blur to be added on the basis of imaging information are generated for motion regions detected by the still/motion determination. In so doing, suitable amounts of motion blur can be added to regions in the motion images where jerkiness is likely to occur.

Consequently, motion images with reduced jerkiness that appears more natural to the human eye can be output without the heavy processing load incurred by detecting motion vectors for each region within a frame. Moreover, since suitable motion blur can be simply added without the heavy processing load associated with methods such as motion vector detection, apparatus simplification and cost reduction can also be realized.

Furthermore, the processing to add motion blur is primarily realized by means of spatial filtering, and since intermediate frames are not generated, the amount of memory used to store image data during the processing sequence can also be reduced.

The spatial filtering process outputs results by conducted weighted addition of pixel values in each layer obtained as a result of executing layered filtering. Consequently, the filters in each layer can be realized with small tap numbers. In addition, the filter tap number does not depend on the amount of motion blur to be added, and thus the use of fixed tap numbers is also possible.

Realization of the embodiment by such recursive processing is particularly suited to hardware-based processing apparatus. Obviously, however, it is possible to realize the above embodiment by means of software, or by a combination of software and hardware.

As described with reference to FIG. 2, the image data OD processed by the motion blur adder 30 may be output by transmission from the transmit processor 60, or recorded onto the recording medium 90 by the recording processor 70. Consequently, a playback apparatus can simply carry out existing playback processing steps to play back either transmitted data transmitted by the motion image imaging apparatus 200, or recorded data recorded on the recording medium 90, without conducting processing to add motion blur like that described in the present embodiment. In so doing, such a playback apparatus is able to cause motion images with reduced jerkiness to be displayed on a display apparatus.

3. Second Embodiment

Playback and Receiving Apparatus

Figure 19:
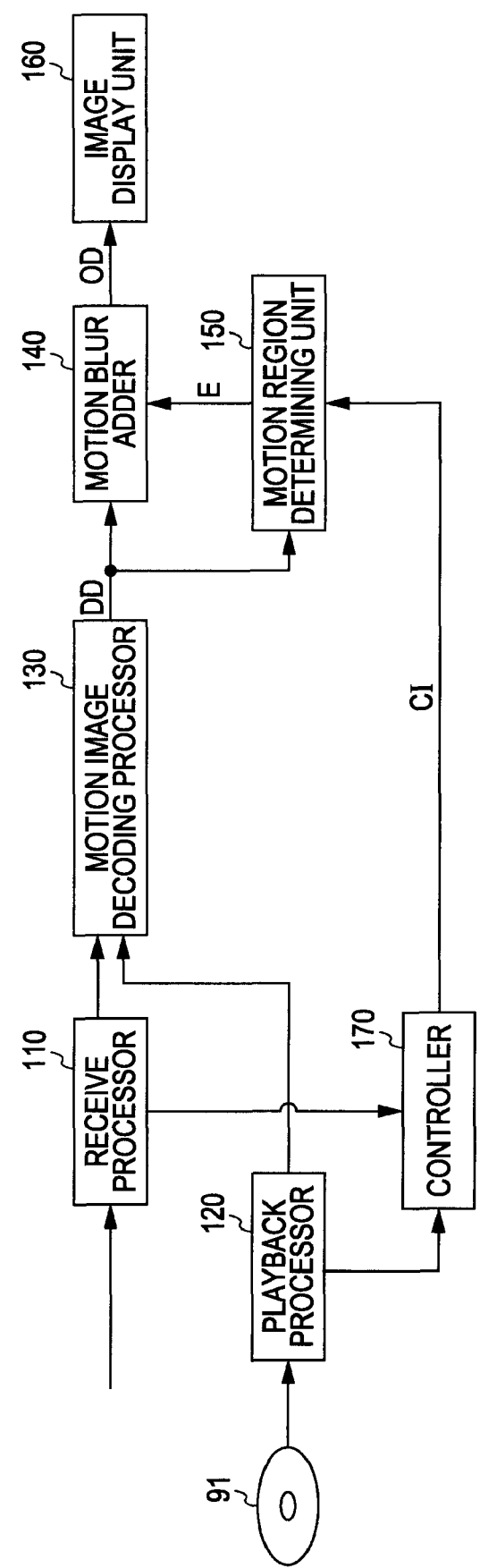
FIG. 19 is a block diagram of a playback and receiving apparatus in accordance with an embodiment of the present invention.

The configuration of a playback and receiving apparatus 300 in accordance with a second embodiment of the present invention is illustrated in FIG. 19. The playback and receiving apparatus 300 is able to receive image data sent by broadcast or other media, play back image data recorded onto a recording medium 91, and then display such image data.

A receive processor 110 receives incoming image data transmitted by means of television broadcast, for example. The receive processor 110 may also be configured to communicate on a network and receive image data by downloading or other delivery format. The receive processor 110 conducts receive and demodulation processing, and then supplies the received data stream to a motion image decoding processor 130 and a controller 170.

A playback processor 120 performs operations to play back image data with respect to the recording medium 91, and then supplies the resulting data stream to the motion image decoding processor 130 and the controller 170.

Both the image data received by the receive processor 110 and the image data played back from the recording medium 91 is encoded image data that has been superposed with imaging information. By way of example, it is assumed that information regarding the imaging apparatus parameters used to acquire the image data is appended thereto as metadata. The imaging information metadata may include, for example, shutter speed information, aperture value information, focal length information, and gyroscope rotation information.

The controller 170 extracts such imaging information from the image data. Subsequently, the extracted imaging information CI is supplied to a motion region determining unit 150.

The motion image decoding processor expands the compression-encoded image data supplied from the receive processor 110 or the playback processor 120, and then supplies the decoded image data DD to the motion region determining unit 150 and a motion blur adder 140.

The motion region determining unit 150 and the motion blur adder 140 are similar to the motion region determining unit 40 and the motion blur adder 30 in the first embodiment described earlier. In other words, the motion region determining unit 150 conducts still/motion determination processing to determine, on a per-region basis, whether the regions in respective frames are motion regions or still regions. In addition, the motion region determining unit 150 generates score values E indicating the amount of motion blur to be added by using the imaging information CI (i.e., information such as shutter speed information, aperture value information, focal length information, and gyroscope rotation information, for example).

On the basis of the score values E, the motion blur adder 140 adds motion blur to the input image data DD, and subsequently outputs output image data OD wherein jerkiness has been reduced.

A image display unit 160 then outputs and displays the output image data OD processed by the motion blur adder 140.

In the above playback and receiving apparatus 300 in accordance with the second embodiment, jerkiness is suitably reduced in image data that has been received or played back from a recording medium, thereby realizing high-quality image display. Additionally, since motion blur can be added similarly to the first embodiment and without the heavy processing load of motion vector detection or similar methods, suitable motion blur can added using simple processing, thereby enabling simplification of the playback and receiving apparatus and reduction in costs.

The foregoing thus describes a first and a second embodiment of the present invention. However, it should be appreciated that the image processing apparatus and image processing method of the present invention are not limited to the foregoing examples, and that various modifications are of course possible without departing from the scope and spirit of the present invention.

Furthermore, although the foregoing embodiments describe a motion image imaging apparatus 200 and a playback and receiving apparatus 300 including the basic configuration illustrated in FIG. 1 as the image processing apparatus 100, the image processing apparatus of the present invention can also be applied to a variety of devices that conduct image processing. For example, it is feasible to apply embodiments of the present invention to an image communicating apparatus, an image recording apparatus, a game device, motion image editing equipment, or a mobile phone, for example.

The image processing apparatus 100, the motion image imaging apparatus 200, and the playback and receiving apparatus 300 described in the foregoing are configured to be logical assemblies of a plurality of processing components. However, it should be appreciated that the processing components illustrated in the respective configurations above are not limited to being housed in a single physical unit.

4. Recording Medium

An embodiment of the present invention may also of course be conceivably realized by a recording medium that stores instructions for operations equivalent to those of the foregoing image processing apparatus 100. The instructions for the operations may then be read from the recording medium and executed on a general-purpose computer or similar information processing apparatus at the time of recording or playing back motion images, for example.

More specifically, although the respective processing components constituting the image processing apparatus 100 described earlier may be realized by means of hardware designed using an FPGA, for example, it is also possible to cause a computer or other information processing device to read instructions from a recording medium and thereby execute the image processing realized by the respective processing components.

For example, a recording medium may be provided storing a program in the form of image processing application software. The program causes a computational processing apparatus to execute the operations of the above motion region determining unit 2 (40, 150), the image acquirer 1 that functions to acquire the imaging information CI, and the motion blur adder 3 (30, 140), for example. Thus, by providing such a recording medium, suitable image processing can be realized on a personal computer or similar apparatus.

More specifically, the program stored on the recording medium causes a computational processing apparatus (such as a CPU) to execute the following steps.

First, the program causes the computational processing apparatus to make a still/motion determination for each region of respective unit images constituting motion image data.

The program then causes the computational processing apparatus to acquire imaging information expressing parameters whereby the motion image data was generated as a result of imaging by an imaging apparatus.

The program then causes the computational processing apparatus to add motion blur to the motion image data on the basis of the still/motion determination and the imaging information acquired in the acquiring step.

By means of a recording medium storing such a program, image processing equivalent to that of an apparatus in accordance with an embodiment of the present invention can be executed on a personal computer, a mobile phone, a PDA (personal digital assistant), and various other information processing apparatus that make use of image data.

The recording medium storing such a program may be an HDD housed in a personal computer or similar device. The recording medium may also be ROM or flash memory incorporated into a microcontroller that includes a CPU.

Alternatively, the recording medium may be a removable recording medium that temporarily or permanently stores the program. In this case, the recording medium may be a flexible disk, a CD-ROM (Compact Disc Read-Only Memory), an MO (magneto-optical) disk, a DVD, a Blu-ray disc, a magnetic disk, semiconductor memory, or a memory card, for example. Such removable recording media may then be provided as packaged software.

In addition, the program may also be installed from a removable recording medium onto a personal computer or similar device, or downloaded from a download site via a network such as a LAN (local area network) or the Internet.

The present application contains subject matter related to that disclosed in Japanese Priority Patent Application JP 2008-194876 filed in the Japan Patent Office on Jul. 29, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   image acquiring means for acquiring image data expressing motion images, the image data including a plurality of frames;
   motion determining means for (1) determining whether each region within an image frame of the plurality of frames is a motion region or a still region; and (2) generating a score value for each region based on the determination and imaging information, the score value being a value expressing the degree of jerkiness for a moving object and the imaging information being a parameter by which the imaging data was imaged by an imaging apparatus; and
   motion blur adding means for adding motion blur to the image data based on the score value.

2. The image processing apparatus according to claim 1, wherein the motion blur adding means adds motion blur to the motion regions.

3. The image processing apparatus according to claim 1, wherein the motion determining means generates the score values by weighted addition using plural types of imaging information.

4. The image processing apparatus according to claim 1, wherein the motion blur adding means adds motion blur such that the amount of motion blur increases with faster shutter speeds, as specified by shutter speed information included in the imaging information.

5. The image processing apparatus according to claim 1, wherein the motion blur adding means adds motion blur such that the amount of motion blur increases with increased aperture values, as specified by aperture value information included in the imaging information.

6. The image processing apparatus according to claim 1, wherein the motion blur adding means adds motion blur such that the amount of motion blur increases with larger focal lengths, as specified by focal length information included in the imaging information.

7. The image processing apparatus according to claim 1, wherein the motion blur adding means adds motion blur such that the amount of motion blur increases with increased gyroscope rotation, as specified by gyroscope rotation information included in the imaging information.

8. The image processing apparatus according to claim 1, wherein the motion blur adding means includes
  a reduced image generator configured to generate, from the image data, one or more reduced images having different resolutions, and
  a pixel compositing processor configured to extract, from the one or more reduced images, pixels positionally corresponding to a subject pixel in the image data, and, on the basis of a value based on the results of the motion determination and the imaging information, add motion blur to the image data by conducting weighted addition of the subject pixel and the one or more extracted pixels that were extracted from the one or more reduced images.

9. The image processing apparatus according to claim 1, wherein
  the image data is input into the motion determining means and the motion blur adding means.

10. The image processing apparatus according to claim 1, further comprising:
  playback means for playing back image data by means of recording medium playback operations;
  wherein
  the image data played back by the playback means is input into the motion determining means and the motion blur adding means.

11. The image processing apparatus according to claim 1, further comprising:
  receiving means for receiving image data;
  wherein
  the image data received by the receiving means is input into the motion determining means and the motion blur adding means.

12. An image processing method, comprising:
  acquiring image data expressing motion images, the image data including a plurality of frames;
  determining whether each region within an image frame of the plurality of frames is a motion region or a still region;
  generating a score value for each region based on the determination and imaging information, the score value being a value expressing the degree of jerkiness for a moving object and the imaging information being a parameter by which the imaging data was imaged by an imaging apparatus; and
  adding motion blur to the image data based on the score value.

13. A non-transitory computer-readable storage medium encoded with instruction that, when executed on a processor, perform an image processing method, the method comprising:
  acquiring image data expressing motion images, the image data including a plurality of frames;
  determining whether each region within an image frame of the plurality of frames is a motion region or a still region;
  generating a score value for each region based on the determination and imaging information, the score value being a value expressing the degree of jerkiness for a moving object and the imaging information being a parameter by which the imaging data was imaged by an imaging apparatus; and
  adding motion blur to the image data based on the score value.

14. An image processing apparatus, comprising:
  an image acquiring unit for acquiring image data expressing motion images, the image data including a plurality of frames; a motion determining unit for (1) determining whether each region within an image frame of the plurality of frames is a motion region or a still region; and (2) generating a score value for each region based on the determination and imaging information, the score value being a value expressing the degree of jerkiness for a moving object and the imaging information being a parameter by which the imaging data was imaged by an imaging apparatus; and
  a motion blur adding unit for adding motion blur to the image data based on the score value.

* * * * *